US007763357B2

(12) United States Patent
Charpentier et al.

(10) Patent No.: US 7,763,357 B2
(45) Date of Patent: Jul. 27, 2010

(54) POLYMER COMPOSITE SYNTHESIS IN SUPERCRITICAL FLUIDS

(76) Inventors: Paul A. Charpentier, 348 Eastcastle Pl., London (CA) N6G 3W5; Xinsheng Li, #7-1430 Jalna Blvd., London (CA) N6E 3C1

( * ) Notice: Subject to any disclaimer, the term of this patent is extended or adjusted under 35 U.S.C. 154(b) by 969 days.

(21) Appl. No.: 11/339,852

(22) Filed: Jan. 26, 2006

(65) Prior Publication Data

US 2006/0194928 A1    Aug. 31, 2006

Related U.S. Application Data

(60) Provisional application No. 60/646,982, filed on Jan. 27, 2005, provisional application No. 60/646,983, filed on Jan. 27, 2005.

(51) Int. Cl.
  *C08L 11/00*    (2006.01)
(52) U.S. Cl. .................. 428/451; 524/430; 524/431; 524/433; 524/439; 524/502; 524/403; 428/461; 428/500; 428/523
(58) Field of Classification Search ............... 428/451, 428/461, 500, 523; 524/403, 430, 431, 433, 524/439, 502
  See application file for complete search history.

(56) References Cited

U.S. PATENT DOCUMENTS

| 4,584,365 A | 4/1986 | Jada et al. ................ 528/271 |
| 5,334,292 A | 8/1994 | Rajeshwar et al. ........ 204/59 R |
| 5,412,016 A | 5/1995 | Sharp ...................... 524/430 |
| 5,492,769 A | 2/1996 | Pryor et al. .............. 428/552 |
| 5,706,064 A | 1/1998 | Fukunaga et al. ......... 349/43 |
| 5,773,489 A | 6/1998 | Sato ....................... 523/115 |
| 5,849,331 A | 12/1998 | Ducheyne et al. ......... 424/484 |
| 6,034,151 A | 3/2000 | Moszner et al. ........... 523/109 |
| 6,159,539 A | 12/2000 | Schwertfeger et al. ..... 427/220 |
| 6,472,104 B1 | 10/2002 | Ulrich et al. ............ 429/302 |
| 6,602,966 B1 | 8/2003 | Vargas et al. ............ 526/64 |
| 6,608,129 B1 | 8/2003 | Koloski et al. .......... 524/403 |
| 6,689,700 B1 * | 2/2004 | Watkins et al. ........... 438/762 |
| 6,730,762 B2 * | 5/2004 | Lousenberg et al. ....... 526/250 |

FOREIGN PATENT DOCUMENTS

JP    2000053801    *    2/2000

* cited by examiner

*Primary Examiner*—Bernard Lipman
(74) *Attorney, Agent, or Firm*—Lynn C. Schumacher; Hill & Schumacher

(57) ABSTRACT

A one step synthetic route of polymeric compositions of a polyolefin and inorganic network consisting of components selected from Si, Zr, Ti, is disclosed. The synthetic route combines parallel reactions of free radical polymerization to form polymer, and hydrolysis of either Si, or Zr, or Ti or both of them precursors. The network consisting of Si, Zr, Ti, is chemically bonded to or within the polymer matrix. The inorganic or organic molecules can then be polymerized under conditions effective to cause the polymerized inorganic or organic molecules into macromolecular networks. The compositions of the polymeric composites can be easily controlled by adjusting the reactant ratio and reaction rate or conditions such as temperature and pressure, wherein the inorganic compositions disperse in nanoscale within polymeric composites when their concentrations fall below moderate levels. A novel synthesis route for making polymer composites and/or polymer nanocomposites of a polyolefin and an inorganic network consisting of components selected from Si, Zr, Ti, is disclosed. The synthesis route comprises hydrolysis of either Si, or Zr, or Ti alkoxides or mixtures of these precursors within a polymer matrix in supercritical fluids.

20 Claims, 26 Drawing Sheets

Conventional Preparation of Polymer Composites -Method One

Improved Method to Prepare Polymer Composite

Method 1

Step 1  Hybrid polymers synthesis via polymerization

Step 2  Introducing inorganic constituents into polymer matrix using supercritical fluids.

Method 2

Step 1  Preparing polymer composite containing required inorganic components.

Step 2  Controlled hydrolysis under supercritical conditions.

Figure 4

Advantages of Improved Methods

- The physical and chemical properties are tunable according to changing monomers and ratio, synthesis conditions

- The matrix state can be controlled from inorganic phase to polymeric phase

- Polymer composites are generated with excellent homogeneous phase comparing to that obtained via the conventional methods.

- Time reduction

- Labor reduction

- Low cost

Figure 5

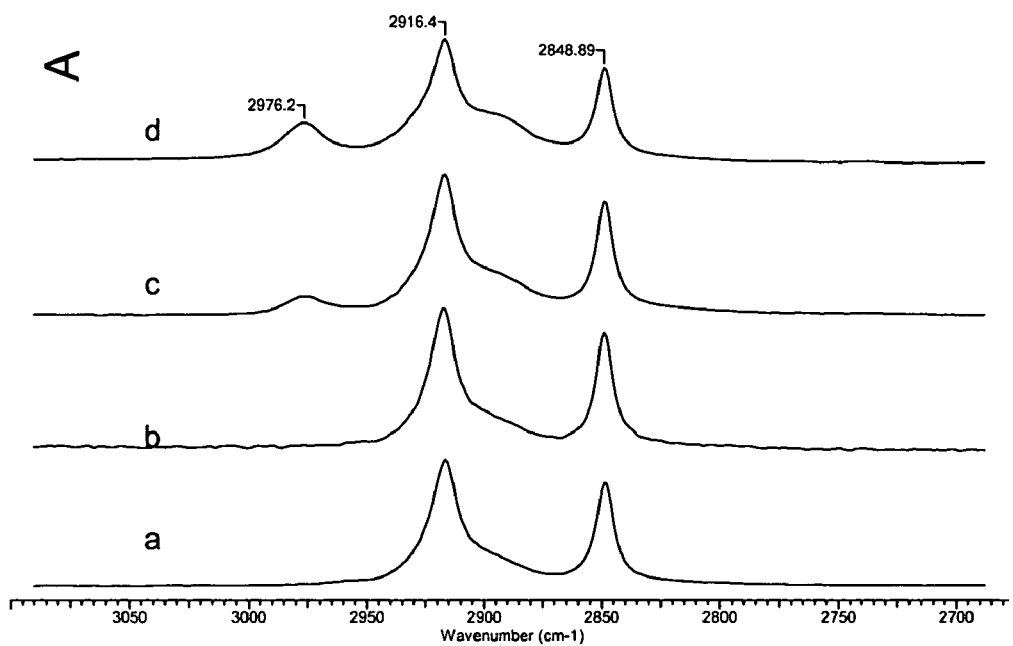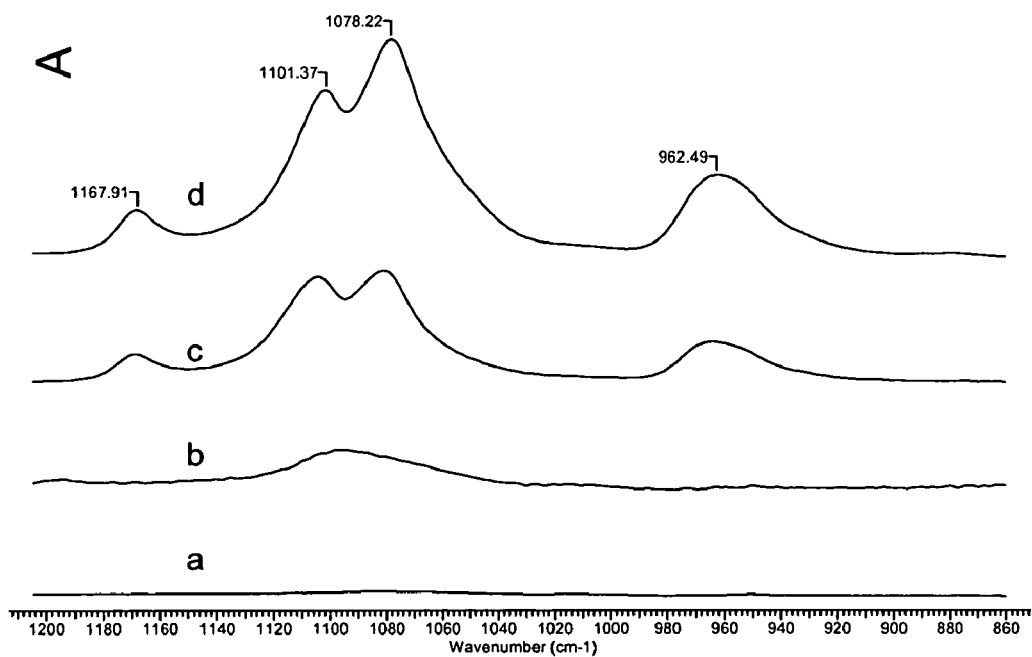
Figure 7

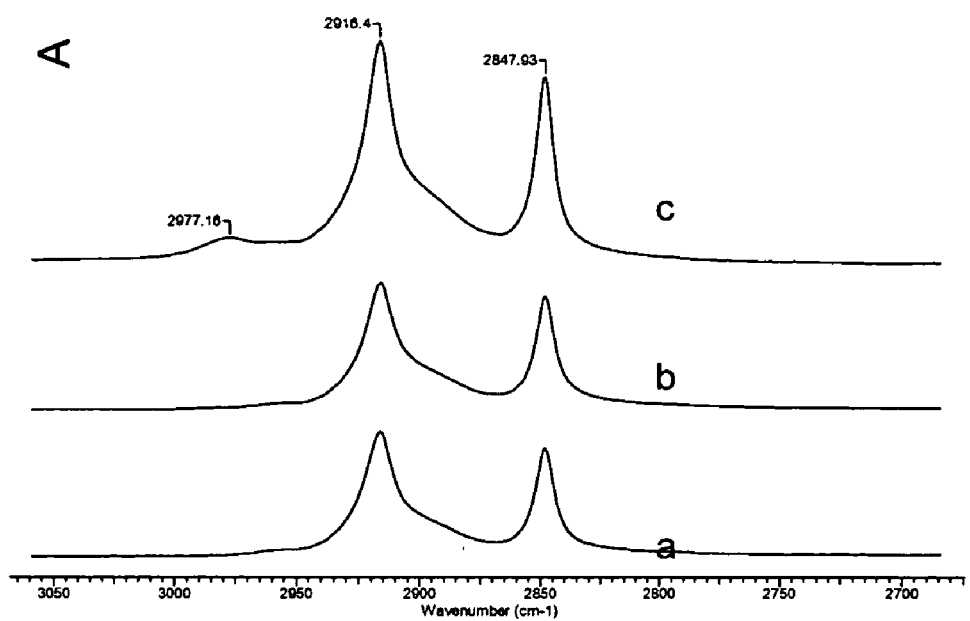
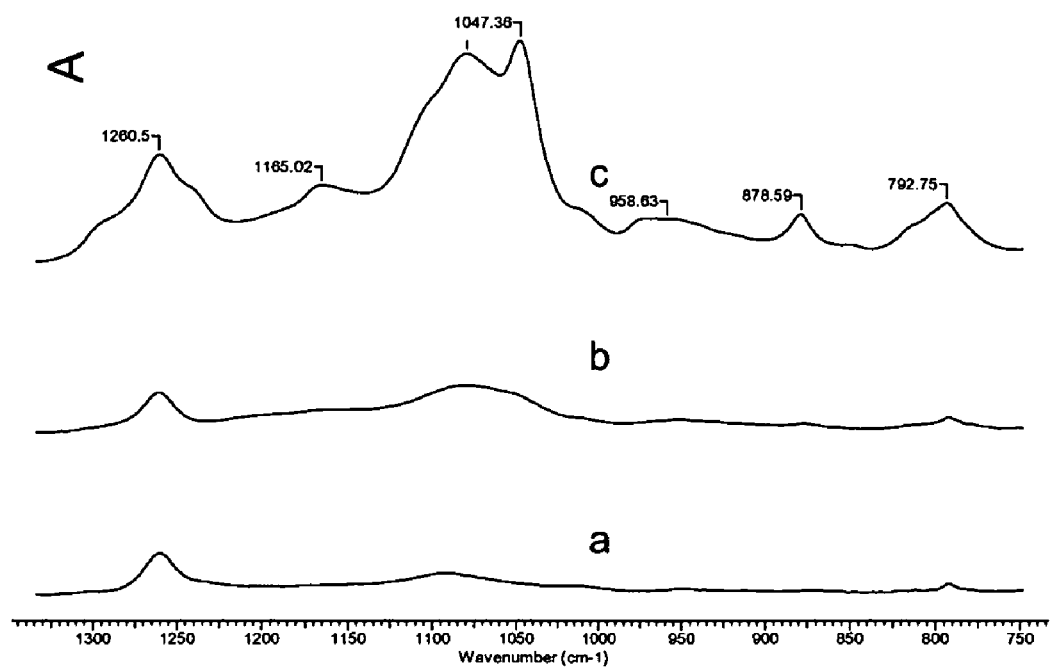
Figure 8

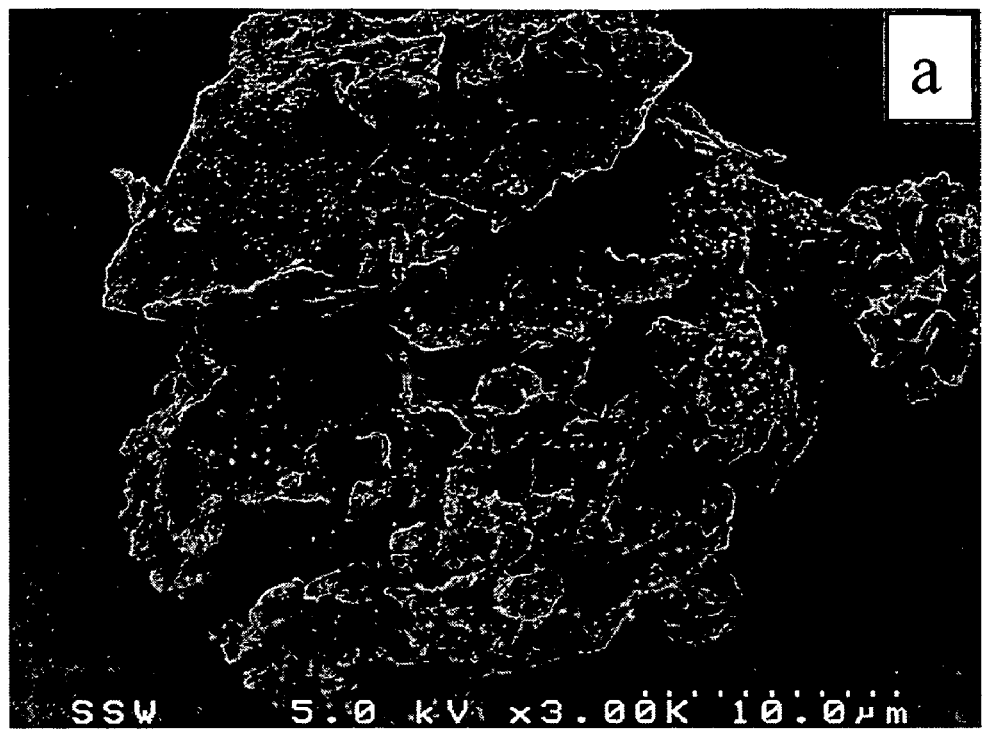
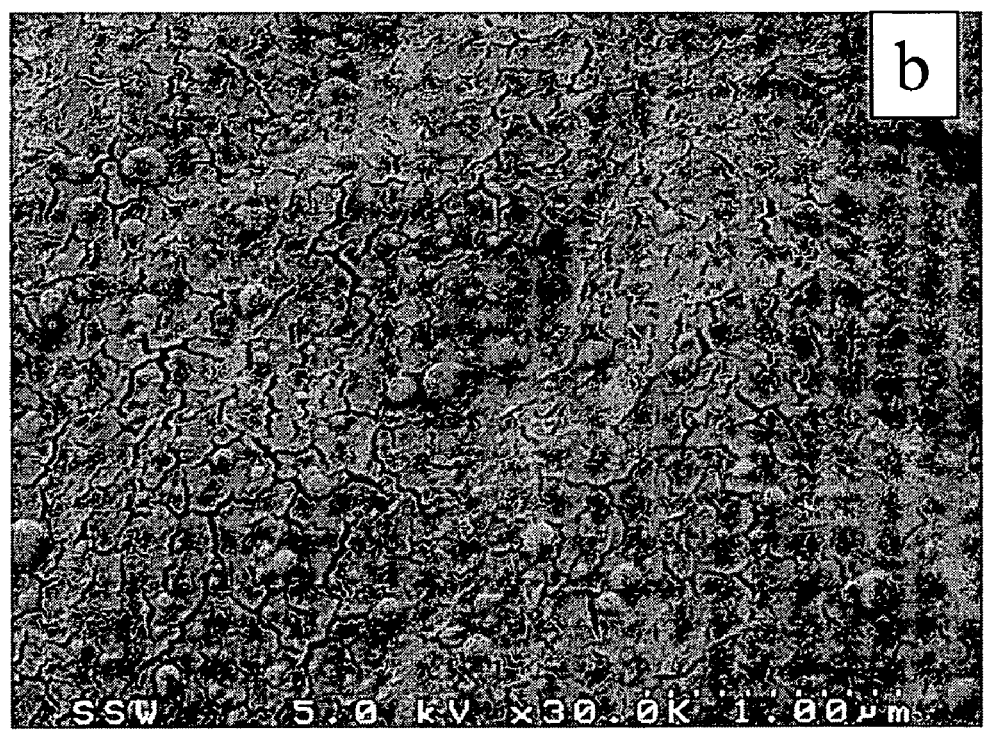
Figure 9

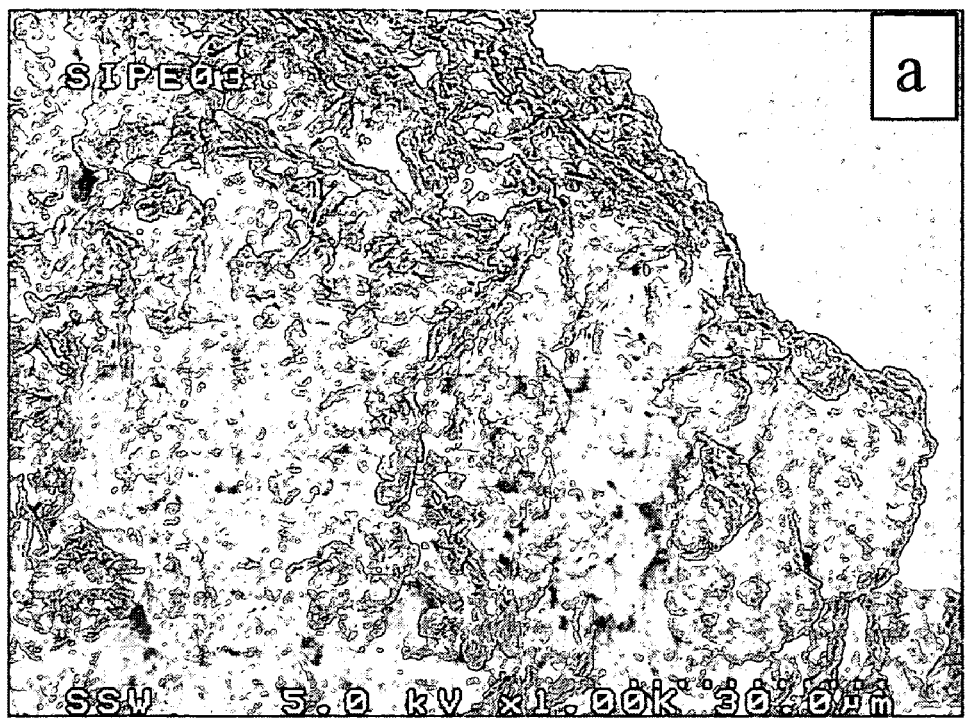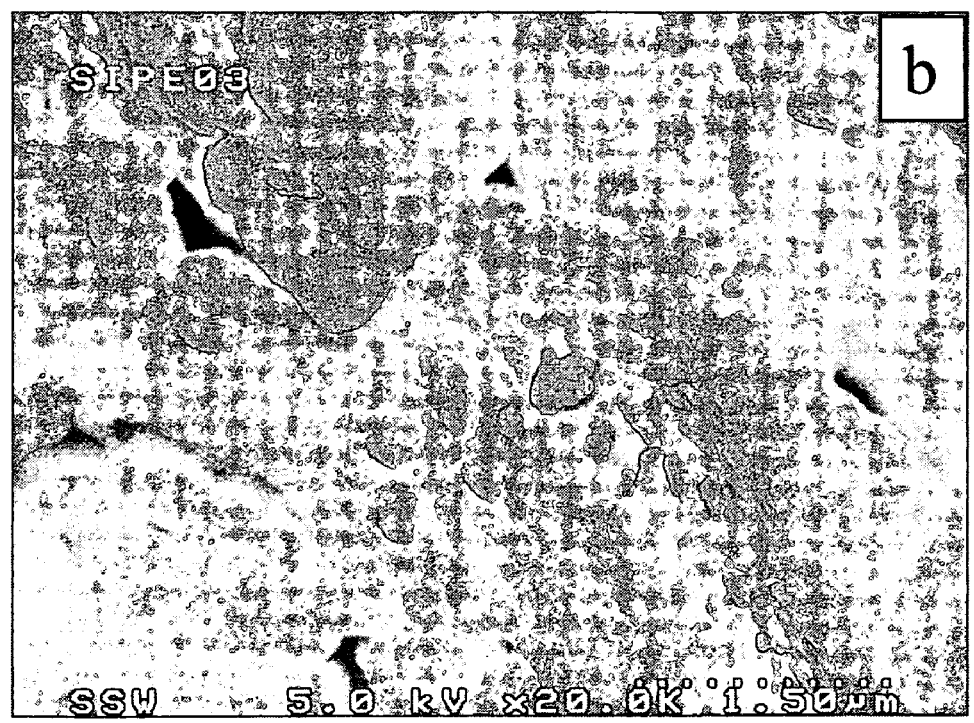
Figure 11

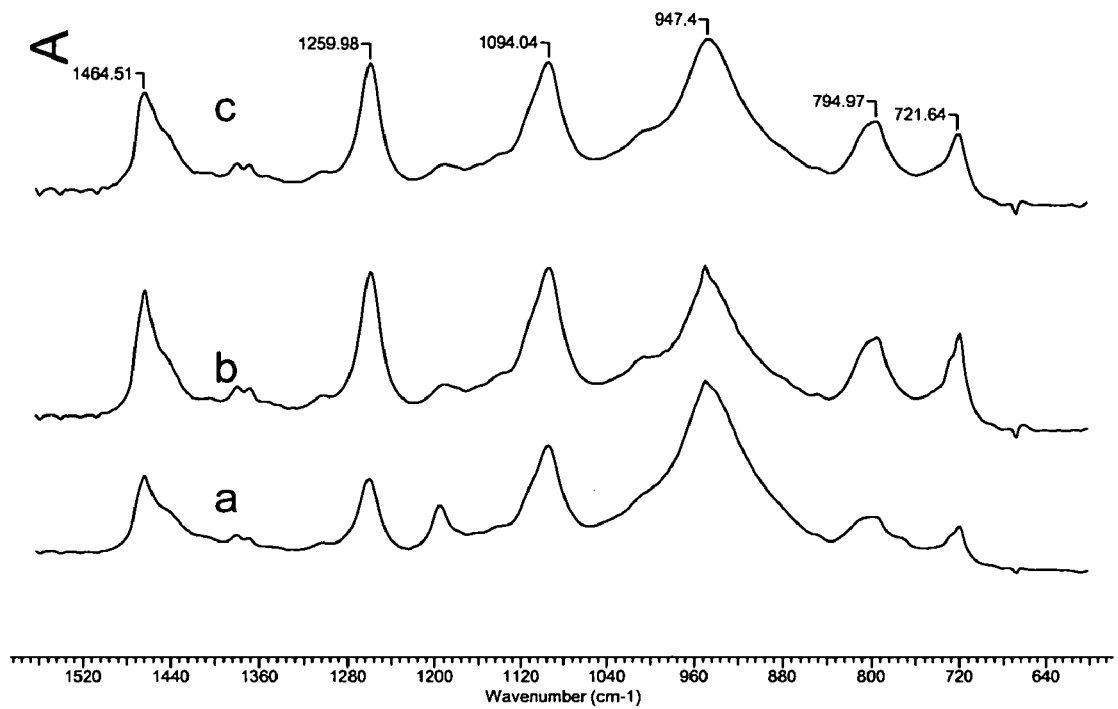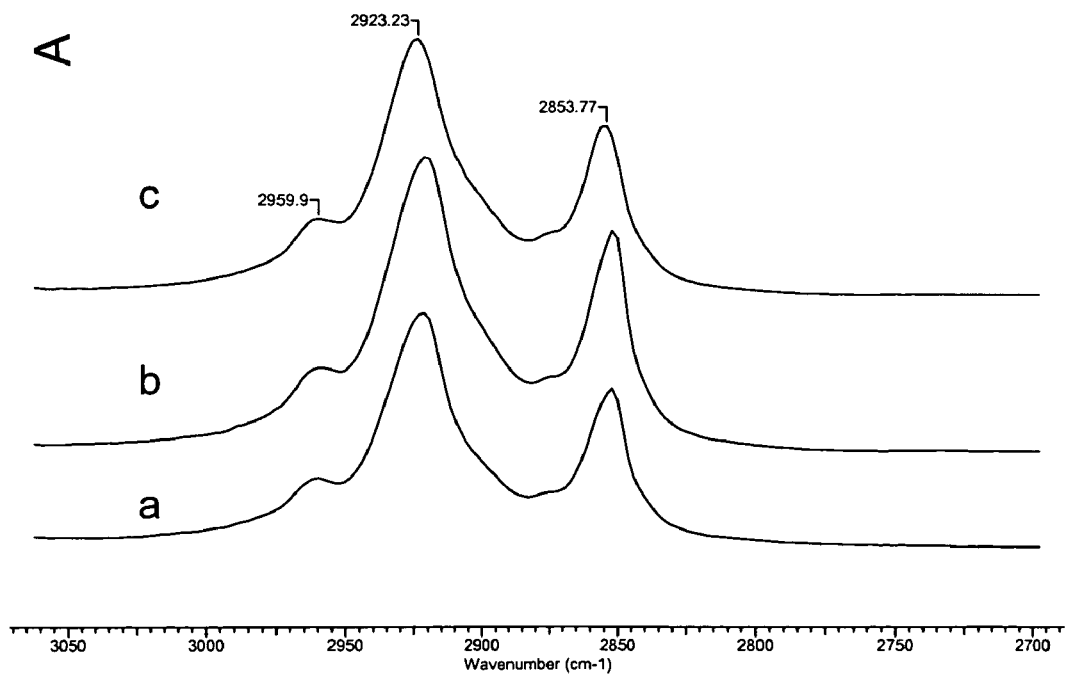
Figure 16

Controlling Factors in One-Step Synthesis for Polymer Composites

- Monomer selection and ratio
- Precursor selection
- Ratio of inorganic component and polymer
- Inorganic salts/ materials selection.
- Reaction condition selection
- Pressure, temperature, concentrations of initiator and hydrolysis agent
- Polymerization rate control
- Partial or full hydrolysis control

Figure 26

POLYMER COMPOSITE SYNTHESIS IN SUPERCRITICAL FLUIDS

CROSS REFERENCE TO RELATED U.S. APPLICATION

This patent application relates to, and claims the priority benefit from, U.S. Provisional Patent Application Ser. No. 60/646,982 filed on Jan. 27, 2005 and U.S. Provisional Patent Application Ser. No. 60/646,983 filed on Jan. 27, 2005, both filed in English, which are incorporated herein by reference in its entirety.

FIELD OF THE INVENTION

The present invention relates generally to the art of synthesis route of polymer composites, polymer nonacomposites, organic-inorganic hybrid material, which contains inorganic and organic parts. More specifically, the present invention relates to a novel synthesis route using supercritical fluids, where the free space of applied polymer is increased under impregnation of the applied supercritical conditions, allowing infusion of reactants and a one-pot synthesis of polymer composites.

BACKGROUND OF THE INVENTION

The present invention relates to the art of synthesis route of polymer composites, polymer nanocomposites, organic-inorganic hybrid material, using supercritical fluids as solvent. Polymer composite in the present invention is defined as a composite containing organic and inorganic parts. The present invention provides an environmentally benign chemical process for synthesis of polymer composites, wherein supercritical fluids acts as solvent. Under impregnation in supercritical fluids, the free volume of applied polymer is increased, allowing molecules or ions to enter for further reaction to generate polymer composites.

Scientists and engineers have been aware of the unique solvent characteristics of supercritical fluids (SCF) for more than 100 years, but it is only in the past three decades that SCF solvents have been the focus of active research and development programs especially in the area of polymer and polymer composites processing. A detailed summary of SCF solvents have been touted as candidate media for inorganic, organic, heterogeneous catalysis and homogeneous catalysis, and polymerization processes, and as environmentally preferable solvents for solution coatings and powder formation. For example, Kajimoto, Chem. Rev., 99 (2), 355-390, 1999 reveals the history of supercritical fluid scientific findings and technology development and discusses the effects of solvation in supercritical fluids on energy transfer and chemical reactions.

In Christopher et al., Chem. Rev., 99 (2), 565-602, 1999 a review of Phase Behavior of Polymers in Supercritical Fluid Solvents has been made. The choice of $CO_2$ as an alternative solvent has a number of advantages. $CO_2$ is environmentally benign, non toxic, non flammable, and easily recyclable. J. Jung and M. Perrut, J. Supercritical Fluids 20,179-219, 2001 describes a review of particles generation in supercritical fluid. As particle design is presently a major development of supercritical fluids applications, mainly in the pharmaceutical, nutraceutical, cosmetic and specialty chemistry industries, number of publications are issued and numerous patents filed each years.

In supercritical fluids, the applied polymer may result in large changes in the host polymer's surface and bulk morphology by swelling effect. For example, in Clarke et al., J. Am. Chem. Soc., 116:8621 (1994), supercritical fluid is used to impregnate polyethylene with $CpMn(CO)_3$ using supercritical $CO_2$ which acts to both solvate the $CpMn(CO)_3$ and to swell the polyethylene, thus permitting the flow of $CpMn(CO)_3$ into the free space created in the swollen polymer and into the free volume of the polymeric material.

Polymer composite in the present invention is defined as a composite containing organic and inorganic parts. Polymer composites have been widely used with success for a variety of applications. For example, U.S. Pat. No. 6,608,129 to Koloski et al. describes disclosed composites for applications as photoradiation shields and filters, electro-magnetic radiation shields and filters, antistatic layers, heterogeneous catalysts, conducting electrodes, materials having flame and heat retardant properties, components in the construction of electrolytic cells, fuel cells, and optoelectronic devices, and antifouling coatings is also described.

U.S. Pat. No. 5,706,064 to Fukunaga et al. disclose composites for applications as liquid crystal displayer, an organic-inorganic hybrid glass, which is subjected to patterning, to form a pixel electrode. U.S. Pat. No. 6,472,104 to Ulrich et al. disclose a process for preparing a solid organic-inorganic hybrid polymer electrolyte containing lithium ions, wherein polyalkylene oxide-containing polymer and a organic lithium salt is mixed to form a mixture. The product shows high strength conductivity and lithium transference values. Further, the product can be self-organized into nanometer scale plates and rods paving the way to making lithium conducting cables for batteries of nanometer size.

The principles of synthesis methods and application of polymer composites can be found in books such as Carrado, Kathleen A. Polymer-Clay Nanocomposites, in Advanced Polymeric Materials, Shonaike, Gabriel O. and Advani, Suresh G, Eds. CRC press, New York, 349-396, 2003; Vincenza et al. Review of Polymer Composites with Carbon Nanotubes, in Advanced Polymeric Materials, Shonaike, Gabriel O. and Advani, Suresh G, Eds. CRC press, New York, 397-438, 2003; W. Shing-Chung et al. Performance Synergism in Polymer-Based Hybrid Materials, in Advanced Polymeric Materials, Shonaike, Gabriel O. and Advani, Suresh G, Eds. CRC press, New York, 439-478, 2003.

Herein is a summary of the synthesis of polymer composites, generally organic polymer is mixed with inorganic part, or organic polymer is formed in inorganic part, or inorganic part formed in organic part. Always these synthesis methods take multiple steps for the final polymer composites.

There are several synthesis routes for polymer composites. FIG. 1-3 describes the general route. The most economic and simple way are mixing the organic part and the inorganic part. The polymer composites are generated either (1) by melting the inorganic part or organic part or both and then mixed into a mixture which was then cured, extracted, or dried, or (2) by dissolving either the organic polymer or inorganic part or both in a solvent, and then introduce one part to another part, and then evaporating the solvent to extract the polymer composites. The resulting polymer composites may have separate inorganic and organic domains, which range from nanometers to tens of micrometers in size. For example, U.S. Pat. No. 5,492,769 to Pryor et al. describes methods for embedding metal or ceramic materials such as diamond, silicon dioxide, aluminum oxide, cubic boron nitride, boron carbide, silicon carbide, silicon nitride, tantalum carbide, titanium carbide, titanium nitride, tungsten carbide, and zirconia alloys and at least one phase stabilization additive selected from the group yttrium, hafnium, calcium, magnesium, and cesium to polymeric materials improve scratch or surface wear resistance of substrates.

U.S. Pat. No. 6,608,129 to Koloski et al. describes methods of that organic polymers are blended with inorganic fillers to improve certain properties of those polymers or to reduce the cost of the polymeric compositions by substituting cheaper inorganic materials for more expensive organic materials.

Polymer composites can be obtained by organic polymer formed on inorganic part through polymerization. Usually a catalyst, which is required to be prepared and be employed to initiate polymerization, is required to synthesis for the inorganic part, then introducing monomers onto the inorganic particle supported catalyst, and polymerization is followed to get organic polymer insulated on the inorganic particles. For example, U.S. Pat. No. 5,334,292 to Rajeshwar et al. discloses one invention concerns an electronically conductive polymer film comprising colloidal catalytic particles homogeneously dispersed in an electronically conductive polymer.

U.S. Pat. No. 6,602,966 to Vargas et al discloses a process producing ethylene (co)polymer nanocomposites in a high pressure polymerization reactor. The process by which nanocomposites having organically modified clays incorporated and intimately dispersed therein involves polymerizing ethylene and one or more optional comonomers under high pressure polymerization conditions in the presence of an organic peroxide initiator and organically modified clay. Such synthesis route has been subjected to a number of academic studies such as, Guan, Z., J. Am. Chem. Soc.; (Communication); 2002; 124(20); 5616-5617; Boone, H. W. et al J. Am. Chem. Soc.; (Communication), 124(30), 8790-8791, 2002; Wieczorek, W. et al, Electrochimica Acta, Vol. 40 (13-14), October, 2251-2258, 1995; Das, N. C. et al., Journal of Applied Polymer Science, Volume: 80, Issue: 10, 16, 1601-1608, 2001.

Polymer composites can be obtained by inorganic polymer formed on or within organic polymer through polymerization. Sometimes a coupling agent required to add to the organic part to enhance interaction of organic part and inorganic part. For example, U.S. Pat. No. 6,034,151 to Moszner et al. discloses hydrolyzable and polymerizable silanes containing vinyl groups can be applied as coupling agent.

U.S. Pat. No. 5,773,489 to Sato describes disclosed dental inorganic-organic composite fillers used for dental restorative materials, wherein the surfaces of the particles are modified with a silane coupling agent. The spherical or spheroidal particles were obtained in situ by co-hydrolysis of metal alkoxides and organic functional group-containing metal alkoxides.

Hydrolysis is a traditional synthesis route to generate inorganic particles either in micro or nano meter size meter. Hydrolysis is also applied to synthesis of polymer composites when polymer is impregnated or applied into the solution. For example U.S. Pat. No. 6,159,539 to Schwertfeger et al. discloses a process for preparing organically modified aerogels, wherein the process of the invention comprises: a) introducing a siliceous lyogel or hydrogel, b) optionally subjecting the gel prepared in a) to complete or partial solvent exchange with an organic solvent, c) reacting the gel obtained in step a) or b) with at least one silylation agent, d) optionally washing the silylated gel obtained in step c) with an organic solvent, and e) drying the gel obtained in step c) or d) subcritically, which comprises reacting in step c) the gel obtained in step a) or b) with at least one chlorine-free silylation agent.

U.S. Pat. No. 6,608,129 to Koloski et al. discloses methods for synthesis of polymer composites, which include a polymer matrix having natural free volume therein and an inorganic or organic material disposed in the natural free volume of the polymer matrix are disclosed. The free volume of organic polymer is evacuated, and inorganic or organic molecules are infused into the evacuated free volume of the polymer matrix. The inorganic or organic molecules can then be polymerized under conditions effective to cause the polymerized inorganic or organic molecules to assemble into macromolecular networks. Use of the disclosed composites as photoradiation shields and filters, electromagnetic radiation shields and filters, antistatic layers, heterogeneous catalysts, conducting electrodes, materials having flame and heat retardant properties, components in the construction of electrolytic cells, fuel cells, and optoelectronic devices, and antifouling coatings is also described.

U.S. Pat. No. 4,584,365 to Jada et al. describes a process for the production of polymeric substances from metal alkoxides, wherein multiple steps were comprised: (a) reacting at least a monofunctional carboxylic acid and at least a monofunctional hydroxylated organic compound in the presence of a suitable esterification catalyst to yield water in situ, and thereafter; (b) adding to the reaction mixture in (a) above at least a divalent metal alkoxide in an amount sufficient to form the desired polymeric network of at least partially hydrolyzed metal alkoxide. This polymer composite is applied for coating materials.

U.S. Pat. No. 581,176 to Ducheyne et al. discloses incorporation of biological molecules into bioactive glasses. In the invention there reports the incorporation of biologically active molecules into the matrix of glass, in particular bioactive glass, using a sol-gel-derived process of production. Therein a sol-gel-derived process using hydrolysis of a phosphorous alkoxide with the silicon alkoxide precursor and calcium alkoxide. Biologically active molecules are incorporated within the matrix of the glass during production.

In the hydrolysis process, there can be one or two or multiple components. For example U.S. Pat. No. 5,412,016 to Sharp discloses one synthesis method of polymer composites. Polymeric inorganic-organic compositions are obtained by intimately mixing a hydrolyzable precursor of an inorganic gel of silicon, titanium, or zirconium with an organic polymer and with an organic carboxylic acid. Such compositions often are transparent, always have improved toughness, as compared with inorganic gels alone, and are believed to have a structure in which the organic polymer is entrapped in the inorganic gel in such an intimate manner that these two components cannot be separated from each other by physical means without destruction of the organic polymer.

Although the polymer composites are homogeneously mixed, they contain separate inorganic and organic phases on a macromolecular scale. These separate phases frequently causes the inorganic part's migration within and/or leaching out of the polymeric matrix. Therefore, the inorganic part of the polymer composites can be separated from the polymer matrix by further processes either chemically or physically. Consequently, this will limit the lifetime.

The conventional synthesis methods as described in FIG. 1-3 usually take multiple steps for the final products of polymer composites. Multiple steps usually have a number of drawbacks of high consumptions of time, labor and cost while producing a large amount of inorganic or organic wastes. In the light of the above, according to the conventional technology, one improved method for synthesis of polymer composites is presented in the present invention. In this patent, improvements have been made to reduce the number of synthesis steps, received organic polymer or inorganic particles are employed and modified for further application, which has been described in FIG. 4.

SUMMARY OF THE INVENTION

An object of the present invention is to provide a novel process for synthesis of polymer composites and polymer nanocomposites, or organic-inorganic hybrid materials. This invention relates to synthesis route of polymer composites and polymer nanocomposites, or organic-inorganic hybrid materials and gives rise to extraordinarily reduction of produced wastes and process costs including labor, time, and chemicals.

In general, the invention relates to the synthesis of polymeric compositions essentially via an improved synthesis route using supercritical fluids. In one aspect, the invention features a synthesis route on obtained polymers in supercritical fluids, the applied polymer provides matrix for further reactions, i.e., hydrolysis or polymerization, or hydrolysis and polymerization.

In another aspect, the invention features a synthesis route containing hydrolysis of Si, or Ti, or Zr alkoxide precursors, or free radical vinyl polymerization, or combining both.

The present invention provides an improved and novel synthesis route for polymeric composites, polymeric nanocomposite, and hybrid materials. The present invention also provides a synthesis route for polymeric composites, polymeric nanocomposite, hybrid materials, wherein the inorganic polymer mostly chemically bonded to the organic polymer.

The present invention also relates to a composite which includes an organic polymer matrix and an inorganic polymer network. The composite also includes an inorganic material disposed in the organic polymer matrix or organic polymer dispersed in inorganic polymer.

The present invention also relates to a method for making a composite which composition can be varied from organic polymer backbone to inorganic polymer network.

The present invention relates to polymeric nanocomposites, which includes a polymer matrix having inorganic particles dispersed in a nano scale within the polymer.

The present invention also relates to a method for making a multiple components composite. The method includes providing a silane as coupling agent, the second or third components or multiple components such as Ti or Zr or Al can then be bonded to the polymer backbone.

Other features and advantages of the invention will be apparent from the following description of the preferred embodiments thereof, and from the claims.

BRIEF DESCRIPTION OF THE DRAWINGS

The following is a description, by way of example only, of embodiments of an apparatus for dispensing powder coatings constructed in accordance with the present invention, reference being had to the accompanying drawings, in which:

FIG. 4 is a diagram illustrating improving synthesis method for polymer composites.

FIG. 5 is a diagram illustrating the advantages of improved methods and one step synthesis route for polymer composites compared to those obtained from conventional methods.

FIG. 7 is a diagram illustrating FT-IR results of synthesized samples. PE, PESi01, PESi02, PESi03.

FIG. 8 is a diagram illustrating FT-IR results of synthesized samples, (a) PESi06, (b) PESi07, (c) PESi08.

FIG. 9 Scanning electron microscopy micrographs of nanocomposite (sample PESi06), low magnification; (b) high magnification.

FIG. 11 is a scanning electron microscopy micrographs of hybrid composite (sample PESi08), (a) low magnification; (b) high magnification.

FIG. 16 is a diagram illustrating in situ FT-IR results of copolymerization of ethylene and VTMO. Reaction Time: (a) 0, (b) 60, (c) 240 min.

FIG. 26 is a diagram illustrating affecting factors on the process.

DETAILED DESCRIPTION OF THE PREFERRED EMBODIMENTS

Figure 1:
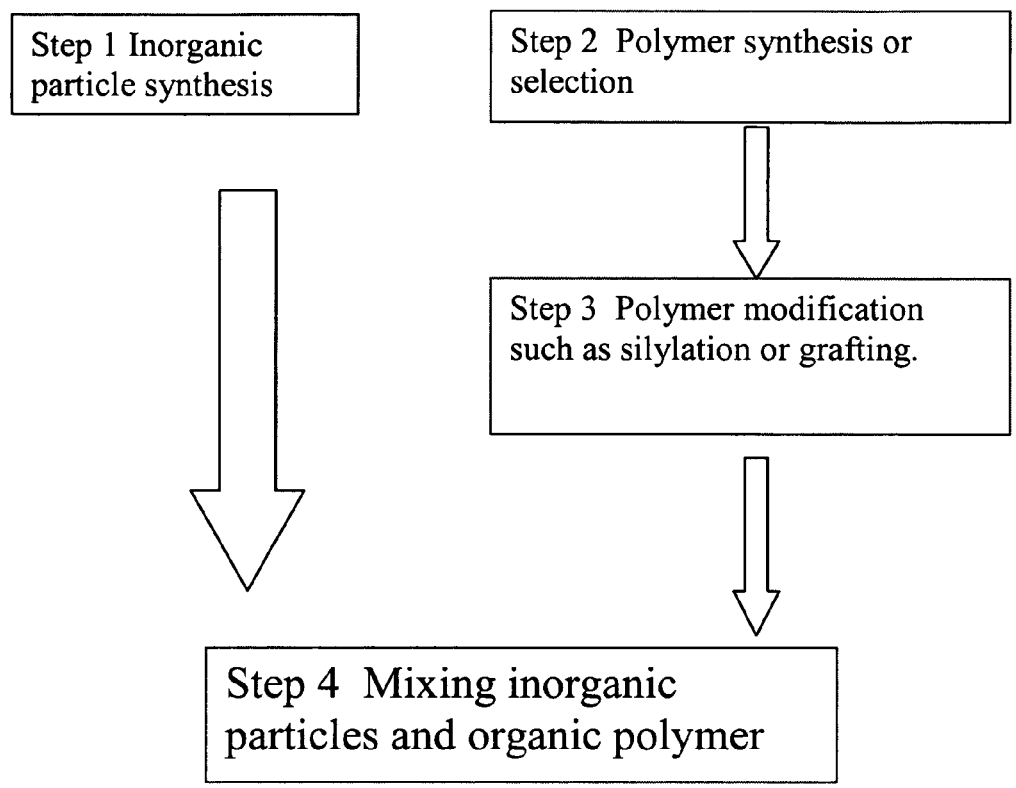
FIG. 1 illustrates a first conventional prior art method of synthesis of polymer composites.
Figure 2:
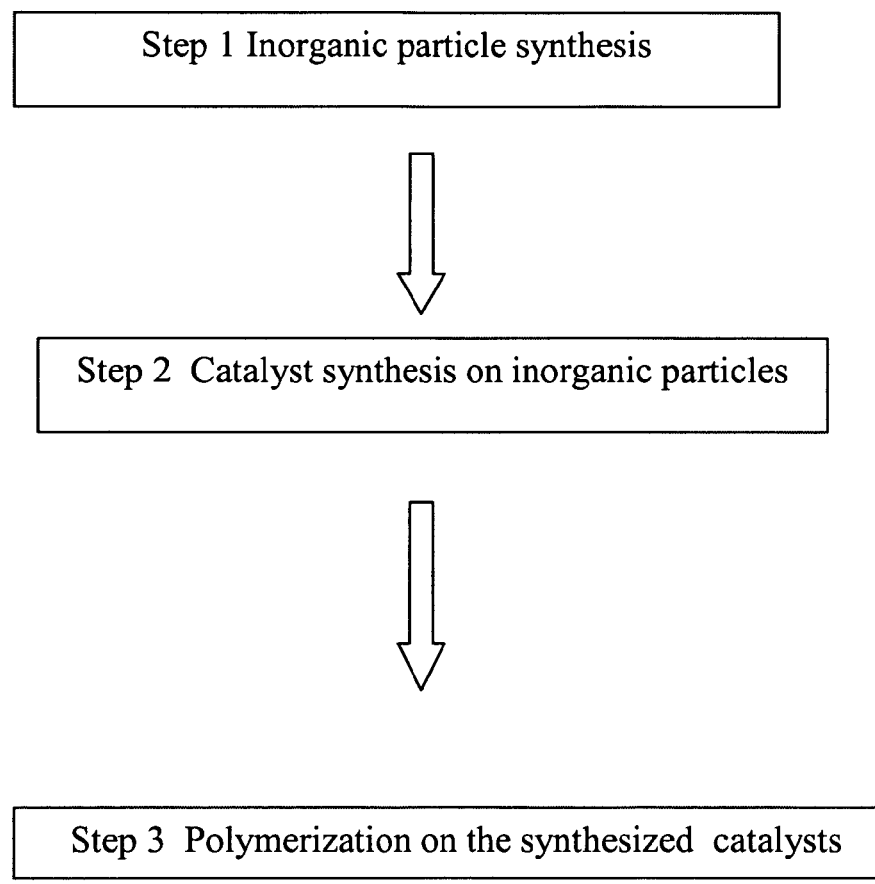
FIG. 2 illustrates a second prior art method of synthesis of polymer composites.
Figure 3:
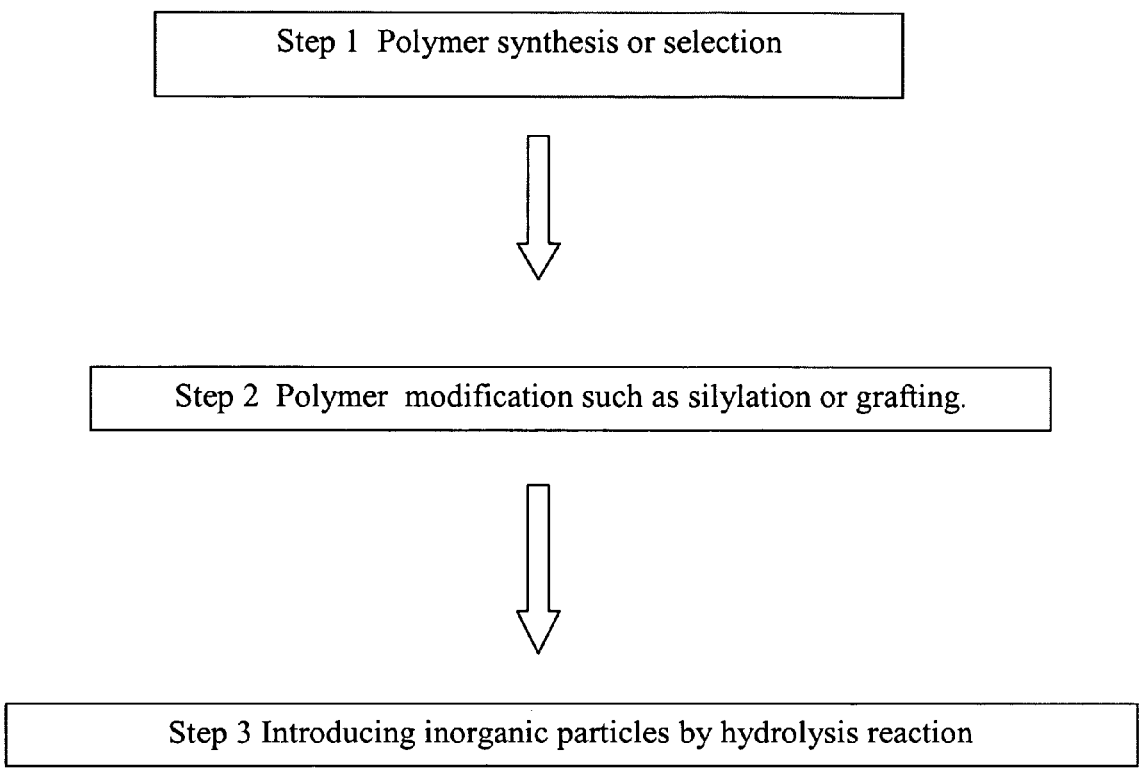
FIG. 3 illustrates a third prior art method of synthesis of polymer composites.

The following abbreviations are used in the examples:
TEOS—Tetraethyl orthosilicate
TMOS—Tetramethyl orthosilicate
VTMO—Vinyltrimethanoxysilane
VA—Vinyl acetate
DEPDC—Diethyl peroxy dicarbonate
PE—Polyethylene
PEVa—Poly(ethylene-co-vinyl acetate)
FT-IR—Fourier Transform Infrared Spectroscopy
ATR—Attenuated Total Reflection
SEM—Scanning Electron Microscopy
RT—Room temperature Various synthesis routes for polymeric composites are known. These synthesis routes generally require several steps to produce the final composites as described in FIG. 1-3. For example, a route to generate fine (nano meter size) particle, a route to polymer, a mixing route of the fine particles and the polymer; an alternative to catalyst developing based on nanometer size particles, then polymerization on the nano size particles; an alternative to synthesis of inorganic particle on the gained polymer; in order to improve increase bonding strength of the polymer and the inorganic particles, the polymer can be further modified by adding one coupling agent. These synthesis routes take high time consumption, high cost in chemicals, and produce large amounts of organic or inorganic wastes in the series of processes.

The present invention provides Improvements to reduce the number of synthesis steps in producing organic/inorganic composites in which organic polymer and/or inorganic particles are employed and modified for further application, which has been described in FIG. 4.

More particularly, the present invention relates to the synthesis of polymeric composites using supercritical fluids. The polymer composites contain both an organic part and an inorganic part. The applied polymer is defined as the first organic part in the present invention, and provide most of the organic part. A second polymer part can be added to the first polymer part via polymerization together with the inorganic part via hydrolysis. Hydrolysis is applied to generate inorganic part within the matrix of the obtained polymer in supercritical fluids.

Parallel reactions of polymerization and hydrolysis are applied to generate both inorganic part and the second organic part within the matrix of obtained polymer in supercritical fluids. The hydrolysis occurs using hydrolysis agents. The polymerization is initiated by free radical initiators.

The present invention has the objective of overcoming the problems of taking multiple steps to generate the polymer composites. The present invention has advantages of generating polymer composites or polymer nanocomposites at a low labor and time consumption, a significant reduction of wastes and cost as depicted in FIG. 5.

The generated materials are defined as polymeric composites in general, polymeric nanocomposites when inorganic network well dispersed in nano meter within the formed backbone of the organic polymer.

The generated materials are also called polymer nanocomposites when either organic part or inorganic part dispersed in the other part in a nano scale, or the particle size of either organic part or inorganic part reaches a nanometer dimensions. The generated materials are also called an inorganic-organic hybrid polymer.

The present invention provides a green synthesis route for polymer composites, which contains both an organic polymer and inorganic part.

In the present invention, organic based polymers from polymerization can be homopolymers, copolymers, terpolymers, multicomponent polymers, or combinations thereof. Suitable chemicals for organic polymers include monomers such as alkylenes ethylene, propylene, butylenes, phenylene-diamine terephthalamide, vinyl alcohol, ethylenically unsaturated monomers, vinyl acetate, alkylene oxides, vinyl chloride, acrylic acid ester or vinyl monomer, vinyl silanes, styrene and the like, fluoroalkylenes, fluoroalkyl vinyl ethers, vinylpyrrolidone, or combinations thereof. And fluoroalkyl, difluoroalkyl, trifluoroalkyl, fluoroaryl, difluoroalkyl, trifluoroalkyl, perfluoroalkyl, perfluoroaryl chloroalkyl, dichloroalkyl, trichloroalkyl, chloroaryl, dichloroalkyl, trichloroalkyl, perchloroalkyl, perchloroaryl, chlorofluoroalkyl, chlorofluoroaryl, chlorodifluoroalkyl, and dichlorofluoroalkyl groups. vinylidine fluoride vinylflouride, chlorotetrafluoroethylene, tetrafluoroethylene, are suitable. Suitable monomers include perfluorinated siloxanes, perfluorinated styrenes, perfluorinated urethanes, perfluoro-2,2-dimethyl-1, 3-dioxide, tetrafluoroethylene, hexafluoropropylene, chlorotrifluoroethylene, ethyleneterphthalates. Phenylene ethers can also be employed as monomers. These include 2,6-dimethyl-1,4-phenylene ether, 2,6-diethyl-1,4-phenylene ether, 2-methyl-6-ethyl-1,4-phenylene ether, 2-methyl-6-propyl-1,4-phenylene ether, 2,6-dipropyl-1,4-phenylene ether, 2-ethyl-6-propyl-1,4-phenylene ether, 2,6-dibutyl-1,4-pheneylene ether, and the like.

Examples of suitable monomers include hexamethylene alipamide, examethylene azelamide, hexamethylene sebacamide, hexamethylene dodecanoamide, bis-(p-aminocyclohexyl) methane dodecanoamide, tetramethylene alipamide and caprolactam and lauryl lactam.

Figure 6:
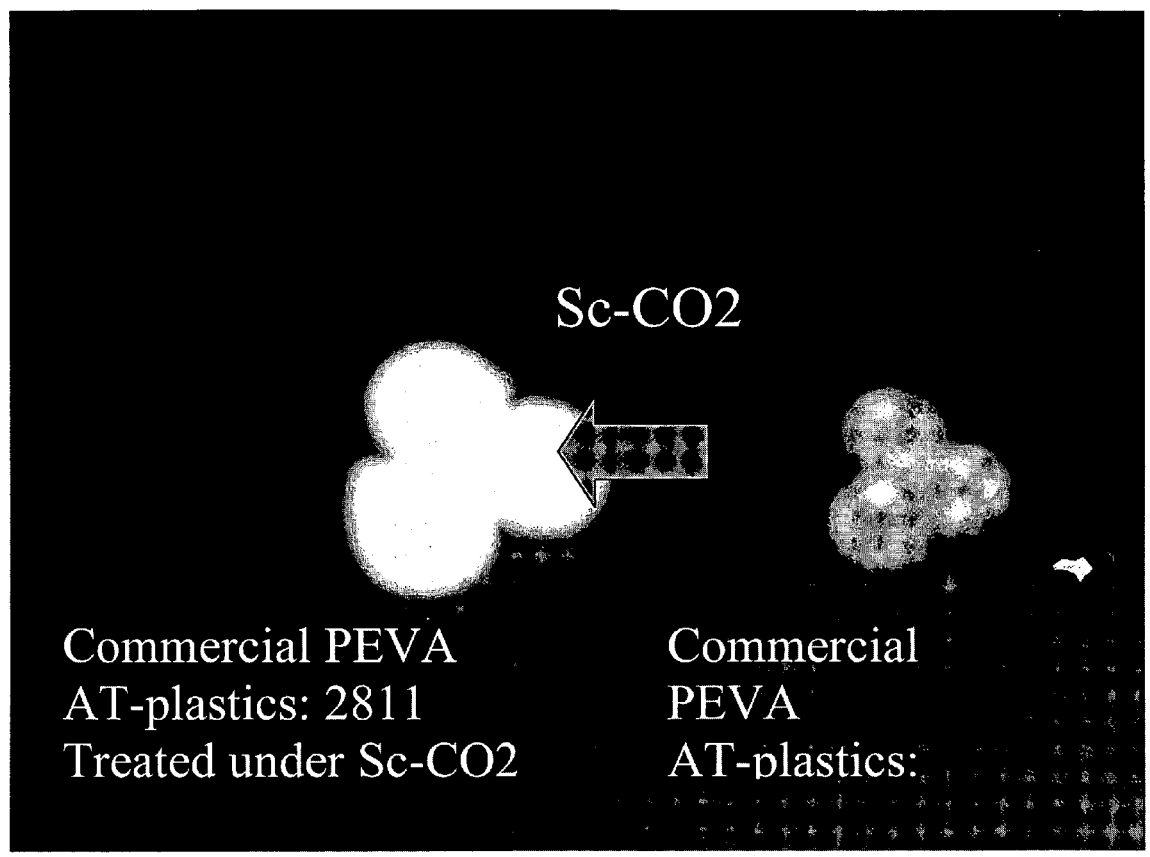
FIG. 6 is a diagram illustrating SEM results of commercial PEVa treated in supercritical $CO_2$.
Figure 10:
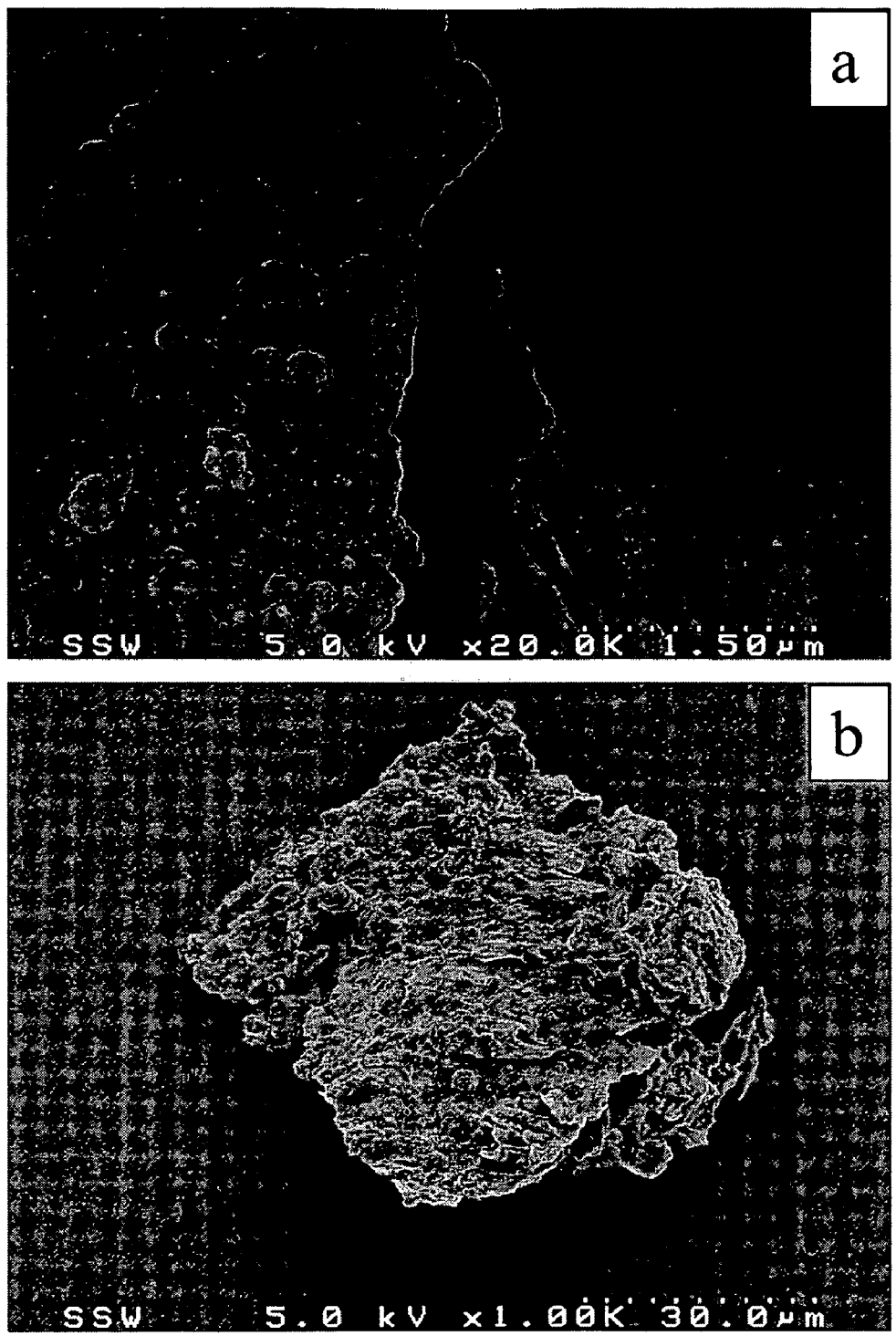
FIG. 10 is a scanning electron microscopy micrographs of microcomposite (sample PESi07).

Under impregnation in supercritical fluids, the free space of the applied polymer is increased as demonstrated in FIG. 6. Therefore the foreigner molecules or ions can diffuse into the free volume to occur further reaction.

Examples of organic compounds to react with the unsaturated double bond of the coupling agent include unsaturated polyesters and resins of monomers having an unsaturated double bond such as methyl methacrylate, ethyl methacrylate, isopropyl methacrylate, 2-hydroxyethyl methacrylate, 3-hydroxypropyl methacrylate, 2-hydroxy-1,3-dimethacryloxypropane, n-butyl methacrylate, isobutyl methacrylate, hydroxypropyl methacrylate, tetrahydrofurfuryl methacrylate, glycidyl methacrylate, 2-methoxyethyl methacrylate, 2-ethylhexyl methacrylate, benzyl methacrylate, phenyl methacrylate, phenoxyethyl methacrylate, 2,2-bis(methacryloxyphenyl)propane, 2,2-bis>4-(2-hydroxy-3-methacryloxypropoxy)phenyl)propane, 2,2-bis(4-methacryloxy-diethoxyphenyl!propane, 2,2-bis(4-methacryloxypolyethoxyphenyl)propane, ethylene glycol dimethacrylate, diethylene glycol dimethacrylate, triethylene glycol dimethacrylate, butylene glycol dimethacrylate, neopentyl glycol dimethacrylate, 1,3-butanediol dimethacrylate, 1,4-butanediol dimethacrylate, 1,6-hexanediol dimethacrylate, trimethylol-propane trimethacrylate, trimethylolethane trimethacrylate, pentaerythritol trimethacrylate, trimethylolmethane trimethacrylate, pentaerythritol tetramethacrylate, and corresponding acrylates thereto, and methacrylates or acrylates having a urethane bond in the molecule thereof, e.g., di-2-methacryloxyethyl-2,2,4-trimethylhexamethylene dicarbamate and a corresponding acrylate thereto.

In the obtained polymer composites, the (Si—O—Si—O)n is a derivative of an alkoxide of Si, and methoxides, ethoxides, n-propoxides, iso-propoxides, n-butoxides, tert-butoxides, and the like can be exemplified. From dimers to hexamers of alkoxides thereof can also be used.

In the obtained polymer composites, the (Si—O—Si—O)n represents derivatives of reactive alkoxysilanes generally called as silane coupling agents. Examples of alkoxysilanes having an unsaturated double bond include 3-methacryloxypropyl trimethoxysilane, 3-methacryloxypropyl triethoxysilane, 3-acryloxypropyl trimethoxysilane, 3-methacryloxypropylmethyl dimethoxysilane, 3-methacryloxypropylmethyl diethoxysilane, 3-acryloxypropylmethyl dimethoxysilane, 2-methacryloxy-ethoxypropyl trimethoxysilane, vinyl trimethoxysilane, vinyl triethoxysilane, and vinyl tris(2-methoxyethoxy)silane. Examples of alkoxysilanes having a glycidoxyl group include 2-(3,4-epoxycyclohexyl)ethyl trimethoxysilane, 3-glycidoxypropyl trimethoxysilane, 3-glycidoxypropylmethyl dimethoxysilane, 3-glycidoxypropylmethyl diethoxysilane, and 3-glycidoxypropyl triethoxysilane. Examples of alkoxysilanes having an amino group include N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, and N-phenyl-3-aminopropyl trimethoxysilane. Examples of alkoxysilanes having a mercapto group include 3-mercaptopropyl trimethoxysilane and 3-mercaptopropyl triethoxysilane. Examples of alkoxysilanes having an alkoxyl group include methyl trimethoxysilane, dimethyl dimethoxysilane, phenyl trimethoxysilane, diphenyl dimethoxysilane, methyl triethoxysilane, dimethyl diethoxysilane, phenyl triethoxysilane, diphenyl dimethoxysilane, isobutyl trimethoxysilane, and decyl trimethoxysilane, in addition to the above-exemplified compounds.

Though the disclosed uses Si as the example, the principle is also available for Ti, Zr, Al, Y, La, or Ta system and the likes. For example, the reactive alkoxysilicate can be replaced with a reactive alkoxytitanium. Examples of titanate coupling agents having an unsaturated double bond include isopropyl dimethacrylisostearoyl titanate, isopropyl diacrylisostearoyl titanate, isopropyl trimethacryl titanate, isopropyl triacryl titanate, oxyacetyl dimethacryl titanate, and oxyacetyl diacryl titanate. Examples of titanate coupling agents having an amino group include isopropyl tri(N-diethylamino) titanate, isopropyl tri(2-aminobenzoyl) titanate, isopropyl tri(tetraethylenetriamine) titanate, isopropyl 4-aminobenzenesulfonyl di(dodecylbenzenesulfonyl) titanate, and isopropyl di(4-aminobenzoyl)isostearoyl titanate. The alkoxyl group and/or titanol group of the above-described coupling agent are/is reacted with derivatives of various alkoxides, acetylacetonatos, nitrates, or acetates of Ti, Zr, Al, Y, La, or Ta.

Examples 1-4

These examples illustrate the hydrolysis of TEOS within polyethylene under supercritical $CO_2$ at 35° C. under pressure P=3000 Psi. 1.0 g polyethylene, TEOS and acetic acid are introduced into the autoclave, and subsequently purged with ethylene to remove air. Then compressed $CO_2$ was introduced into the autoclave and the reactor was heated to 35° C. Compressed $CO_2$ was continually added into the autoclave to reach the desired pressure at 3000 Psi. The system was run for 24 hrs. After the reaction, the autoclave was cooled down and the compressed $CO_2$ was vented out. The collected sample was washed by methanol and dried in a vacuum oven at room temperature. The melting temperature of these synthesized samples (PESi01-04) are summarized in Table 1. FTIR results of the synthesized samples from examples 1, 2, 3 are displayed in FIG. 7, which illustrates the silica glass formed within the matrix of polyethylene.

Example 5

This example illustrates the hydrolysis of TMOS within polyethylene under supercritical $CO_2$ at 35° C. at a pressure P=3000 Psi. 1.0 g polyethylene, TMOS and acetic acid were introduced into the autoclave, subsequently purged with ethylene to remove air. Then compressed $CO_2$ was introduced into the autoclave and heating started to reach 35° C. Compressed $CO_2$ was continually added into the autoclave to reach a pressure of 3000 Psi. Afterwards, the system was run for 24 hrs. After the reaction, the autoclave was cooled down and the compressed $CO_2$ was vented out. The collected sample was washed by methanol and dried in a vacuum oven at room temperature. The melting temperature of this synthesized sample (PESiO5) is summarized in Table 1.

Examples 6-8

These examples illustrate the hydrolysis of TEOS within polyethylene in supercritical $CO_2$ at 60° C. at a pressure P=3000 Psi. 1.0 g PE, TEOS and acetic acid were introduced into the autoclave, subsequently purged with ethylene to remove air. Then the compressed $CO_2$ was introduced to the autoclave and heating raised to 60° C. Compressed $CO_2$ was continually added into the autoclave to reach a pressure at 3000 Psi. Afterwards, the system was run for 24 hrs. After the reaction, the autoclave was cooled down and the compressed $CO_2$ was vented out. The collected sample was washed by methanol and dried in a vacuum oven at room temperature. The melting temperatures of these synthesized samples are summarized in Table 1. FTIR results of the synthesized samples from examples 6, 7, 8 are displayed in FIG. 8, which show the silica glass formed within the matrix of polyethylene.

Figure 12:
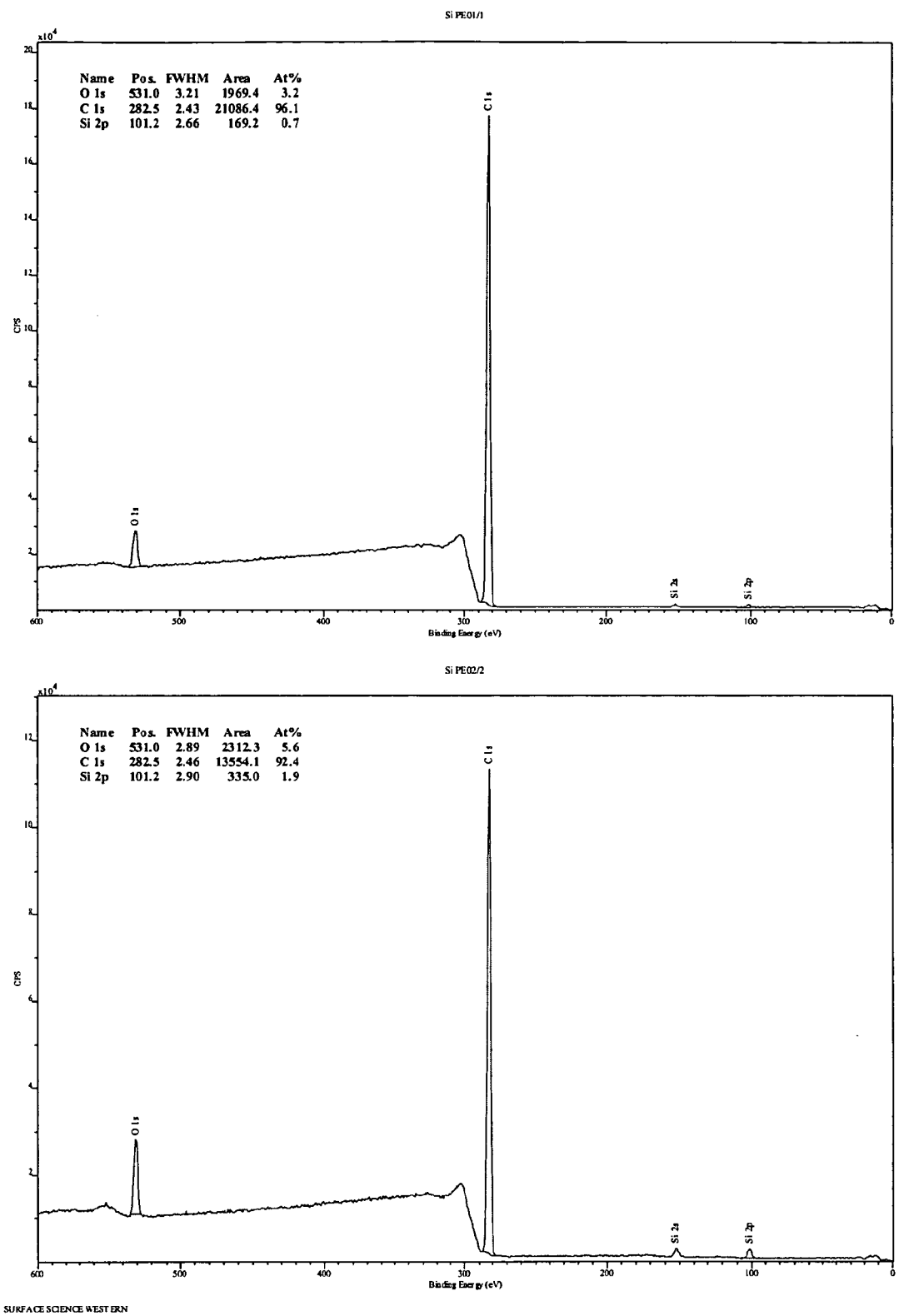
FIG. 12 is a diagram illustrating XPS result of polymer composite obtained by hydrolysis of TEOS with acetic acid at 60° C. within polyethylene under supercritical $CO_2$. Sample: upper PESi06 and down PESi07.
Figure 13:
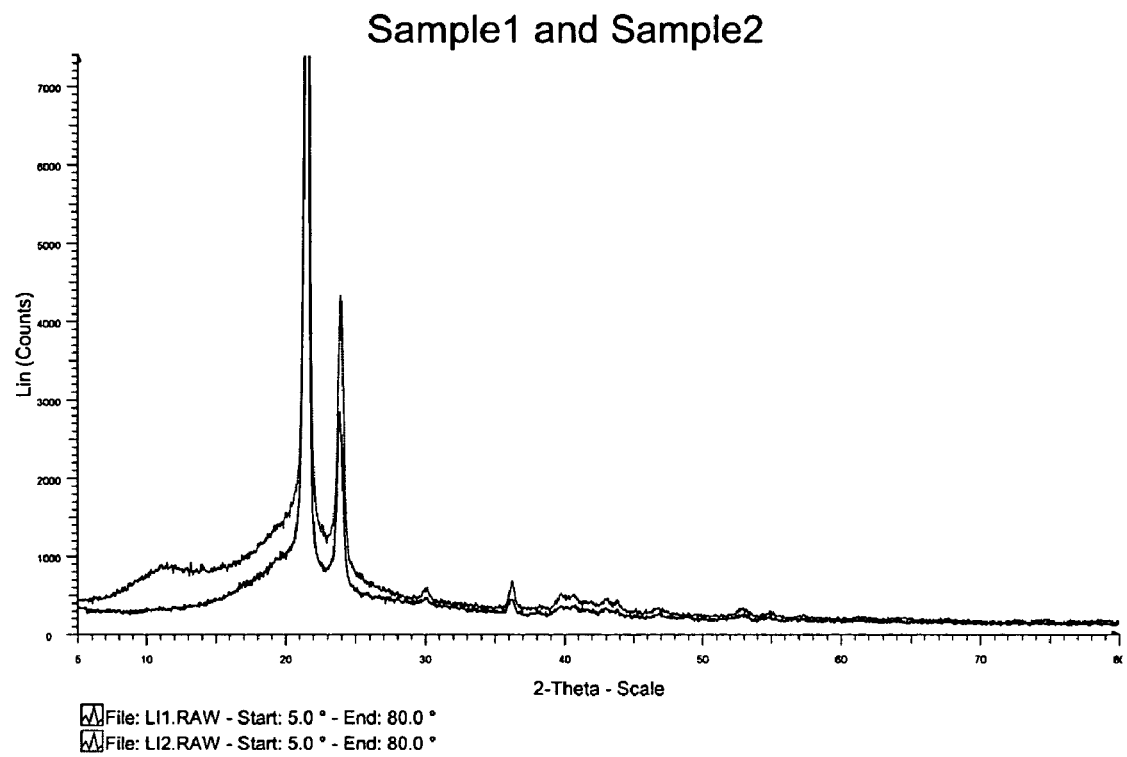
FIG. 13 is an X-ray diffraction analysis of polymer composites of (a) PE and (b) PESi08.

The dispersion of the formed silica gel particles for samples from examples 6, 7 and 8 is depicted in FIG. 9, 10, 11. It is demonstrated that nano meter silica glass particles were formed within the matrix of polyethylene when the silica concentration was low, and the silica gel network was formed on the surface of polyethylene when increasing the silica concentration. Furthermore, XPS results of samples from examples 6 and 7 are displayed in FIG. 12, which illustrates the silica gel formed within the matrix of the PE. The XRD pattern of the sample from example 8 is displayed in FIG. 13, which illustrates the amorphous phase of silica gel formed within the matrix of PE.

TABLE 1

Synthesized silica hybrid samples

| Sample | Synthesis Condition | Si wt % | $T_m$ (° C.) |
| --- | --- | --- | --- |
| PE | | | 116.17 |
| PESi01 | 35° C., P = 3000 Psi, TEOS | 3.1 | 116.67 |
| PESi02 | 35° C., P = 3000 Psi, TEOS | 5.9 | 116.83 |
| PESi03 | 35° C., P = 3000 Psi, TEOS | 10.5 | 117.00 |
| PESi04 | 35° C., P = 3000 Psi, TEOS | 14.1 | 116.33 |
| PESi05 | 35° C., P = 3000 Psi, TMOS | 3.1 | 116.83 |
| PESi06 | 60° C., P = 3000 Psi, TEOS | 2.5 | 114.33 |

TABLE 1-continued

Synthesized silica hybrid samples

| Sample | Synthesis Condition | Si wt % | $T_m$ (° C.) |
|---|---|---|---|
| PESi07 | 60° C., P = 3000 Psi, TEOS | 5.9 | 114.00 |
| PESi08 | 60° C., P = 3000 Psi, TEOS | 10.5 | 114.17 |

Examples 9 and 10

Figure 14:
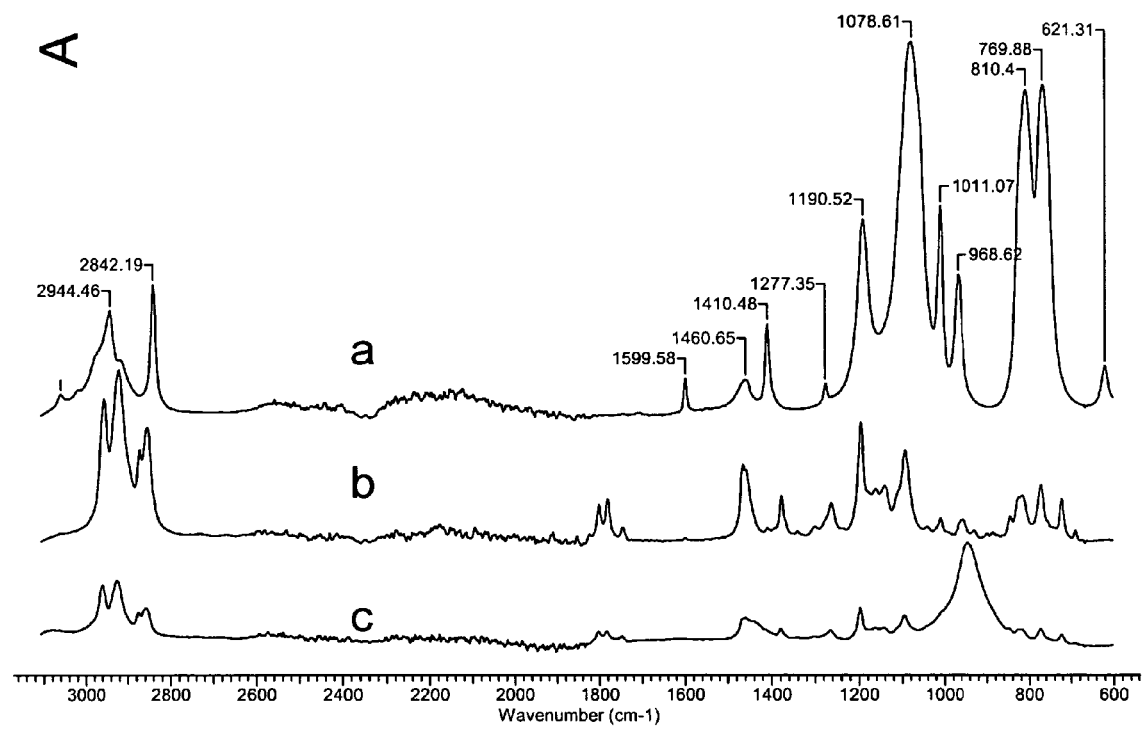
FIG. 14 is a diagram illustrating in situ FT-IR results of copolymerization of ethylene and VTMO, (a) VTMO, (b) VTMO/EPDPC/Heptane, (c) adding ethylene, T=35° C., P=1250 Psi.
Figure 15:
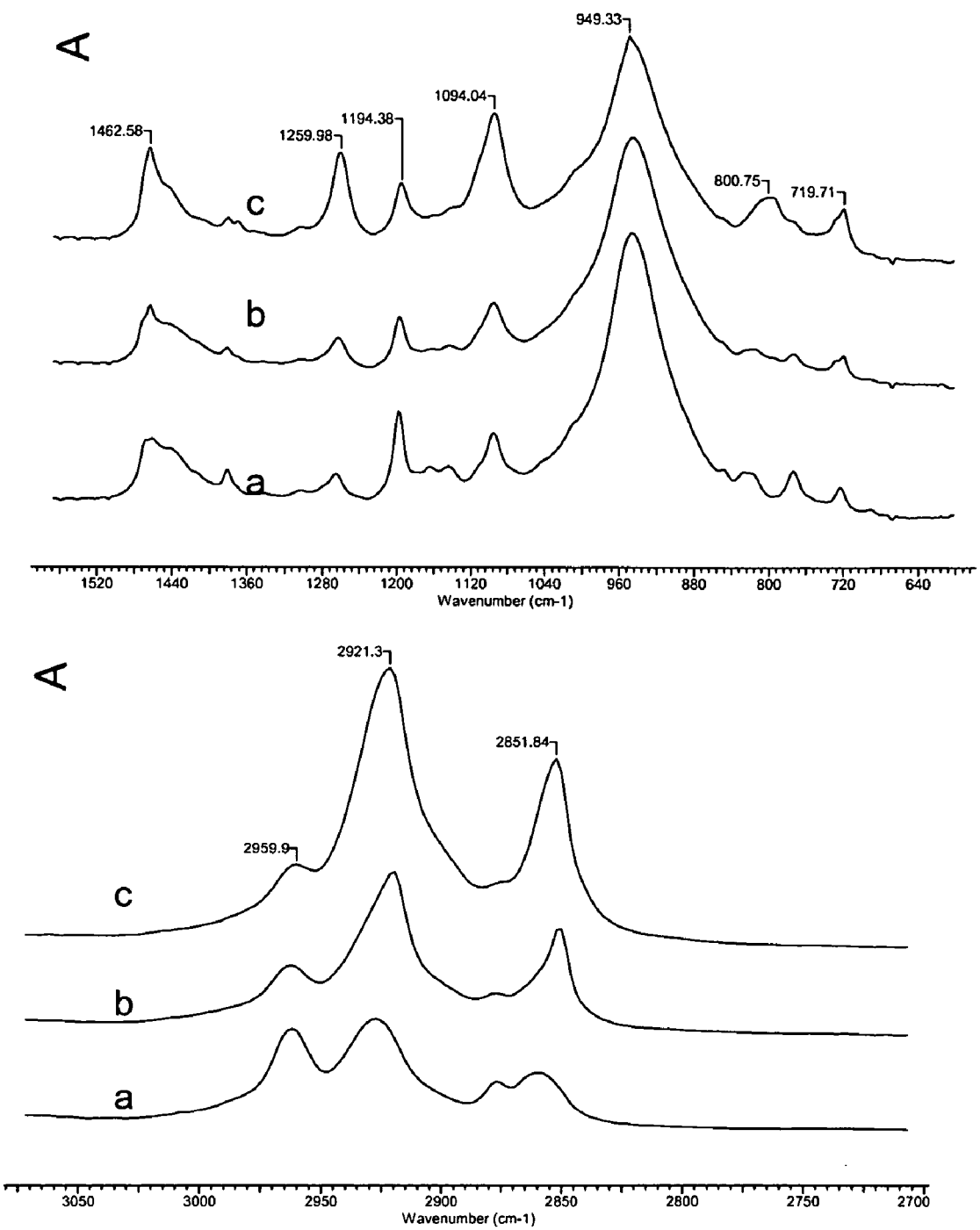
FIG. 15 is a diagram illustrating in situ FT-IR results of copolymerization of ethylene and VTMO. Heating Procedure: (a) 35° C., Pethylene=1220 Psi; (b) 60° C., Pethylene=2020 Psi; (c) 80° C., Pethylene=2500 Psi.
Figure 17:
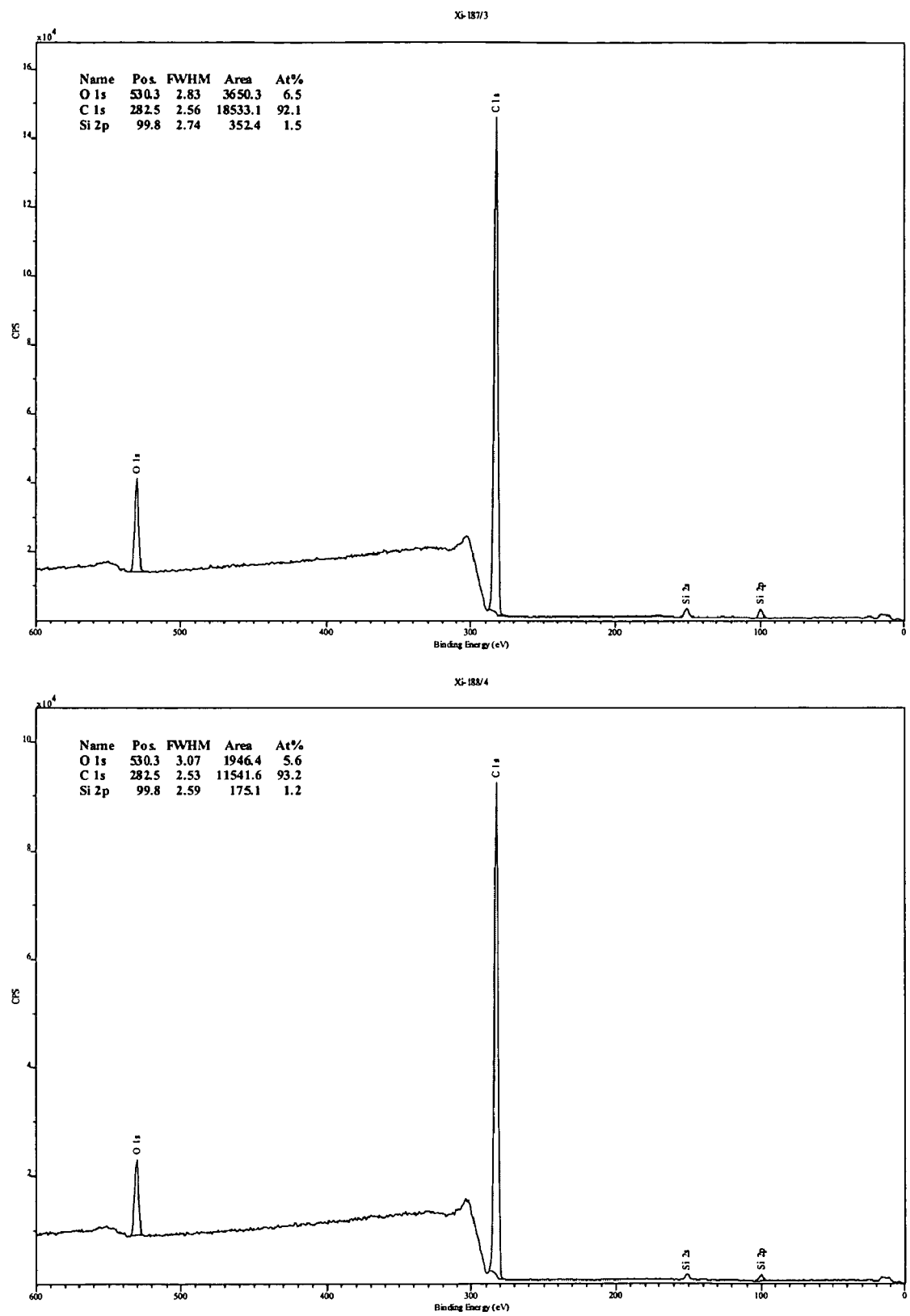
FIG. 17 is a diagram illustrating XPS result of polymer composite obtained by hydrolysis of TEOS with acetic acid at 60° C. within polyethylene under supercritical $CO_2$. Samples from examples 9 (upper) and 10 (down).

These examples illustrates the copolymerization of ethylene and VTMO under supercritical $CO_2$ at 60° C. under pressure P=2500 psi. Pre-cooled reactants and the initiator dissolved in heptane were weighed and added into one 100 ml Parr microautoclave. By means of an ISCO syringe pump (260D), the compressed ethylene was pumped into the autoclave to purge for three times to remove air, then continually to about 950 Psi at room temperature. The autoclave was heated to the desired temperature at 60° C. at a rate of 3° C./min, while gradually pumping compressed ethylene to P=2500 Psi. The stirring speed was controlled at 400 revolutions per minute (rpm). The autoclave was coupled with an insitu FTIR with an ATR probe and pressure transducer, which allows monitoring of the reaction process and ethylene consumption. The reaction lasted for 4 hours in which the ethylene consumption rate was monitored. The system pressure was kept at a constant pressure of 2500 Psi, a pulse technique of compressed ethylene was applied in order to measure the ethylene consumption rate. After the reaction, the autoclave was cooled to room temperature, and compressed ethylene was carefully vented leaving the solid sample in the autoclave. The collected sample was washed using about 50-65 ml methanol for three times in a filter connected to a vacuum line, and subsequently dried in a vacuum oven at 30° C. overnight. The dried sample was weighed and applied as the final product. The reaction condition for samples from example 9 and 10 was compared in Table 2. The synthesized procedure were followed by insitu FTIR samples from example 9 and displayed in FIGS. 14, 15 and 16. These results demonstrate vinyl silane incorporated into the formed polyethylene through copolymerization under supercritical ethylene. Furthermore, the reaction rate of ethylene was compared in Table 3. XPS results of samples from examples 9 and 10 are displayed in FIG. 17, which illuminate surface silica composition in the obtained polymer composites.

TABLE 2

Synthesized silica hybrid samples DEPDC = 0.0075 mol in 15 g heptane.

| Sample Effect of $W_{VTMO}$ | Condition | Sample weight (g) |
|---|---|---|
| No. 9 | 80° C., P = 2500 Psi, $W_{VTMO}$ = 1 g. | 9.85 |
| No. 10 | 80° C., P = 2500 Psi, $W_{VTMO}$ = 2 g. | 6.69 |

TABLE 3

Comparison of ethylene reaction rate during copolymerization of ethylene and VTMO

| | Reaction rate of ethylene (g min$^{-1}$) | |
|---|---|---|
| Time Period (min) | in Example 9 1 g (VTMO) | in Example 10 2 g (VTMO) |
| 0-30 | 0.18 | 0.089 |
| 30-60 | 0.066 | 0.043 |
| 60-120 | 0.017 | 0.0097 |
| 120-180 | 0.0027 | 0.0027 |
| 180-240 | 0.0025 | 0.00 |

Examples 11-13 illustrates an alternative synthesis route for polymer composites and/or polymer nanocomposites.

Example 11

This example illustrates the polymerization of vinyl acetate on the nano powder of zirconia in supercritical $CO_2$. 10.10 g vinyl acetate, 0.0047 mol diethyl peroxyldicarbonate (DEPDC) in 10 g heptane, 0.20 g nano powder of zirconia are introduced into the autoclave, subsequently purged with $CO_2$ to remove air. Then, the compressed $CO_2$ was introduced into the autoclave and started heating to 80° C. The compressed $CO_2$ was continually added into the autoclave to reach a pressure of 2300 Psi. Afterwards, the system was run for 4 hrs. After the reaction, the autoclave was cooled down and $CO_2$ was vented out. The collected sample was a white adhesive. Cooled methanol was added to the sample and stir gently. After drying under vacuum at room temperature, solvent was removed and the sample becomes white solid. $ZrO_2$ content is calculated as 1.95% by weight.

Example 12

This example illustrates the polymerization of vinyl acetate and vinyltrimethanoxysilane (VTMO) and hydrolysis of VTMO with acetic acid on the nano powder of zirconia in supercritical $CO_2$. 10.10 g vinyl acetate, 0.0047 mol diethyl peroxyldicarbonate (DEPDC) in 15 g heptane, 0.60 g vinyltrimethanoxysilane (VTMO), 0.93 g acetic acid, and 0.20 g nano powder of zirconia were introduced into the autoclave, subsequently purged with $CO_2$ to remove the air. Then, the compressed $CO_2$ was introduced into the autoclave and heating initiated to 80° C. The compressed $CO_2$ was continually added into the autoclave to reach a pressure of 2850 Psi. The system was run for 4 hrs. After the reaction, the autoclave was cooled down and $CO_2$ was vented out. The collected sample was a white adhesive. Cooled methanol was added to the sample and stirred gently. After drying under vacuum at room temperature, the solvent was removed and the sample was a white solid. $ZrO_2$ content was calculated as 1.88% by weight, and $SiO_2$ content 2.31 wt %.

Example 13

This example illustrates the polymerization of vinyl acetate and vinyltrimethanoxysilane (VTMO), and hydrolysis of tetraethyl orthosilicate and NTMO with acetic acid on the nano powder of zirconia in supercritical $CO_2$. 10.57 g vinyl acetate, 0.0047 mol diethyl peroxyldicarbonate (DEPDC) in 15 g heptane, 0.61 g vinyltrimethanoxysilane (VTMO), 1.17 g tetraethyl orthosilicate (TEOS), 2.37 g acetic acid, and 0.21 g nano powder of zirconia were introduced into the autoclave, subsequently purged with $CO_2$ to remove the air. Then the compressed $CO_2$ was introduced into the autoclave and starts heating to 80° C. The compressed $CO_2$ was continually added into the autoclave to reach a pressure of 3000 Psi. Afterwards, the system was run for 4 hrs. After the reaction, the autoclave was cooled down and the CO2 was vented out. The collected sample was a white adhesive. Cooled methanol was added to the sample and stirred gently. After drying under vacuum at room temperature, the solvent was removed and the sample was a white solid. $ZrO_2$ content was calculated as 1.74% by weight, and $SiO_2$ content 5.15 wt %.

One-Pot Nanocomposite Synthesis in Supercritical Fluids

A series of examples are shown to prove the concept of the one-step synthesis route in supercritical fluids including carbon dioxide and ethylene. In this route, the following reactions occur: a) free radical polymerization (includes initiation, propagation and termination steps), b) hydrolysis to produce metal oxide particles, and c) linkage of the metal oxide particles to the polymer chain.

Figure 18:
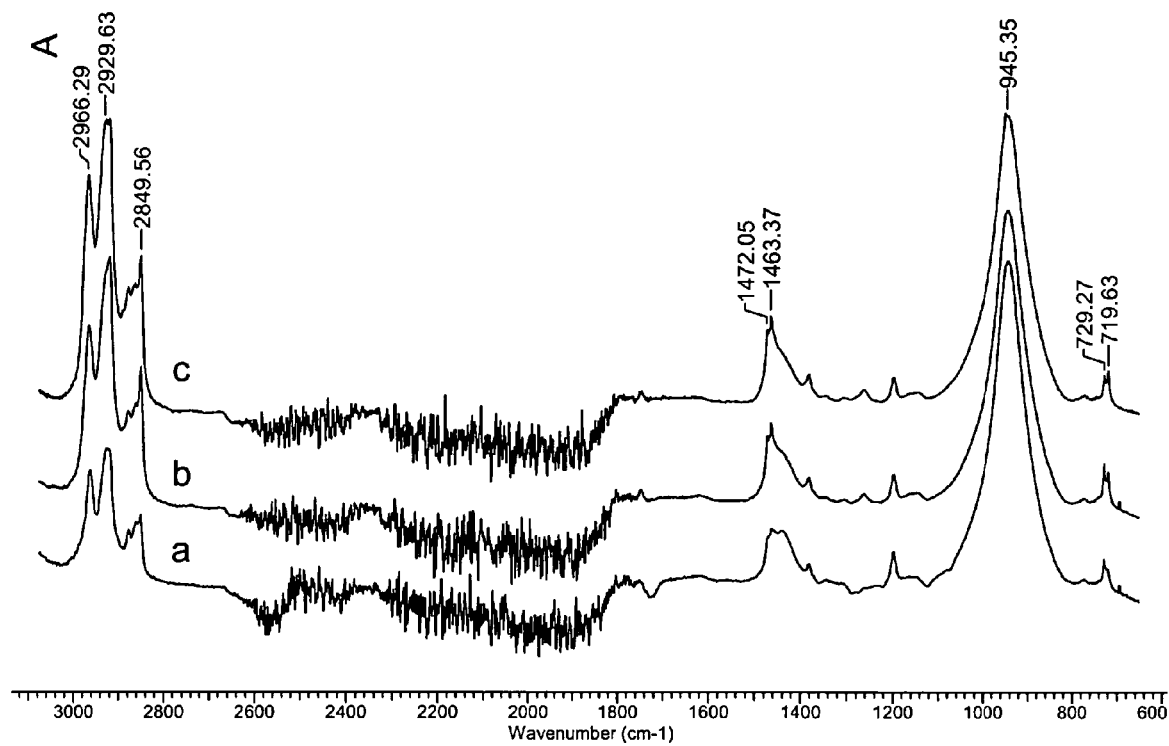
FIG. 18 is a diagram illustrating in situ FT-IR results of ethylene polymerization.

Ethylene can be polymerized at above 40° C. to generate white powder, increasing the reaction temperature results in an increased rate of reaction. Examples are selected and described as in FIG. 18. Herein polymerization was carried out at 40, 50 and 60° C., respectively. The characteristic peaks of polyethylene at 2929, 2849 $cm^{-1}$, 1472 and 1463 $cm^{-1}$, 729 and 720 $cm^{-1}$ increased corresponding to polyethylene formation during the polymerization. The collected polyethylene is white powder. These examples illustrate possibility of free radical polymerization of ethylene can occur under supercritical conditions.

Figure 19:
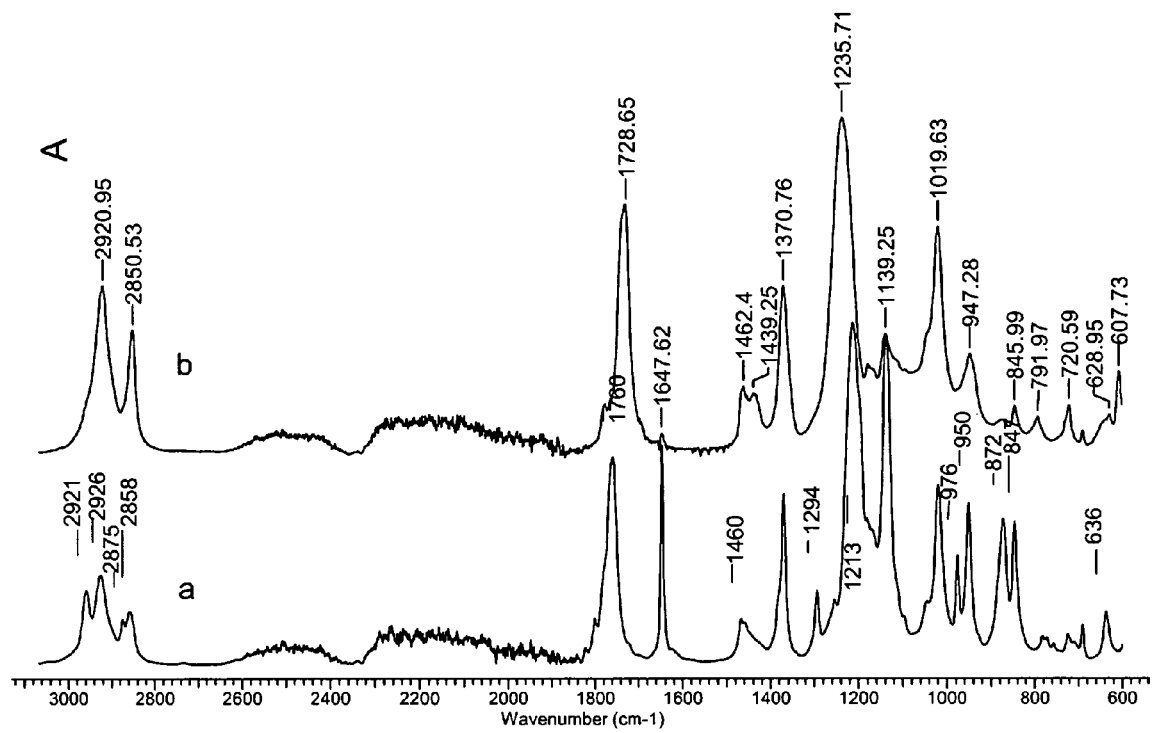
FIG. 19 is a diagram illustrating in situ FT-IR results of polymerization of ethylene and vinyl acetate. a. before reaction; b. after reaction, cooling down to room temperature and venting ethylene out.

Copolymerization of ethylene and vinyl acetate occurs at or above 40° C., increasing the reaction temperature results in an increased reaction rate. One example is selected and described as in FIG. 19. It is seen that vinyl acetate was consumed corresponding to the increase in intensity of the peak at 1648 $cm^{-1}$, the formation of PEVa corresponding to the increases in intensities of peaks at 2920 and 2850 $cm^{-1}$ and 1729 $cm^{-1}$. The collected poly(ethylene-co-vinyl acetate) is either white powder or adhesive solid depending upon the ratio of ethylene and vinyl acetate. These examples illustrate the possibility of the free radical copolymerization of ethylene and vinyl acetate can occur under supercritical conditions.

Copolymerization of ethylene and VTMO occurs at above 60° C., increasing the reaction temperature results in increasing the reaction rate. One example is selected and described as shown previously in FIG. 15. During the heating copolymerization of ethylene and VTMO is seen to occur corresponding to the increases of intensities of peaks at 2921 and 2852 $cm^{-1}$, 1260 and 1094 $cm^{-1}$. The collected polymer composite is a white powder. The property of polymer composites varies up the ratio of ethylene and silicate. This example illustrates the possibility of free radical copolymerization of ethylene or vinyl acetate or both and VTMO can occur under supercritical conditions.

Hydrolysis of TEOS with acetic acid occurs at above 30° C. under supercritical $CO_2$. Increasing reaction temperature to 60° C. results in full hydrolysis of TEOS. Examples are selected and described as discussed previously and shown in in FIGS. 8 and 9 where FIG. 8 is a FT-IR spectra of polymer composites, which shows the formation of Si—O bonding in (Si—O—Si)n network within polyethylene corresponding to appearance of peaks at 1261 and 1047 $cm^{-1}$ while FIG. 9 is a SEM photomicrograph of the polymer composite showing that the formed silica particles can reach a high dispersion in a nano-scale.

The above examples illustrate possibilities of separate polymerization or copolymerization of ethylene and vinyl acetate or ethylene and VTMO and hydrolysis of TEOS/VTMO with acetic acid under supercritical conditions.

The one step synthesis route is developed based on these separate reactions, which reflects different parts of one step synthesis route.

The present invention is further illustrated by the following non-limiting examples. The following examples illustrate the present invention but are not intended to limit it in any manner.

General Procedures of Synthesis of Polymer Composites

Pre-cooled reactants and the initiator dissolved in heptane were weighed and added into one 100 ml Parr microautoclave. By means of an Isco syringe pump (260D), the compressed ethylene was pumped into the autoclave to purge for three times to remove air, then continually to about 950 Psi at room temperature. Heating the autoclave to designed temperature 80° C. at a rate of 3° C./min and while gradually pumping compressed ethylene to P=2500 Psi. The stirring speed was controlled at 400 revolutions per minute (rpm). The autoclave was coupled with an in-situ FTIR using an ATR probe and a pressure transducer, which allows monitoring the reaction process and ethylene consumption. Though a relatively fast reaction was observed during the first hour, the reaction lasted for 4 hours for detailed observations of ethylene consumption rate and enhancement of complete hydrolysis of organic alkaloxides. The system pressure was kept at a constant pressure of 2500 Psi. A pulse technique of compressed ethylene was applied in order to measure the ethylene consumption rate. After the reaction, the autoclave was cooled to room temperature, and compressed ethylene was carefully vented leaving the solid sample in the autoclave. The collected sample was washed by about 50-65 ml methanol for three times in a filter connecting to vacuum line, and subsequently dried in a vacuum oven at 30° C. overnight. The dried sample was weighed and applied as the final product.

Example 14

This example illustrates the copolymerization of ethylene and VTMO and hydrolysis of TEOS/VTMO with acetic acid under supercritical ethylene.

Figure 20:
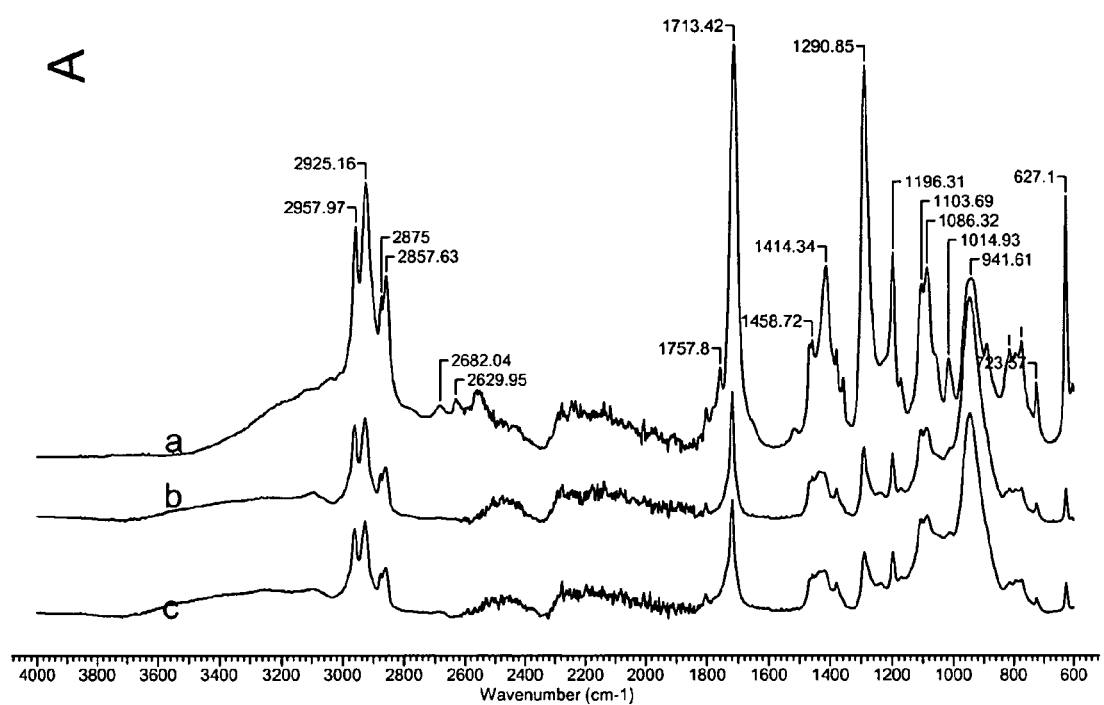
FIG. 20 is a diagram illustrating in situ FT-IR results of the initial stage of parallel reactions of copolymerization of ethylene and VTMO and hydrolysis of TEOS/VTMO (Example 14).
Figure 21:
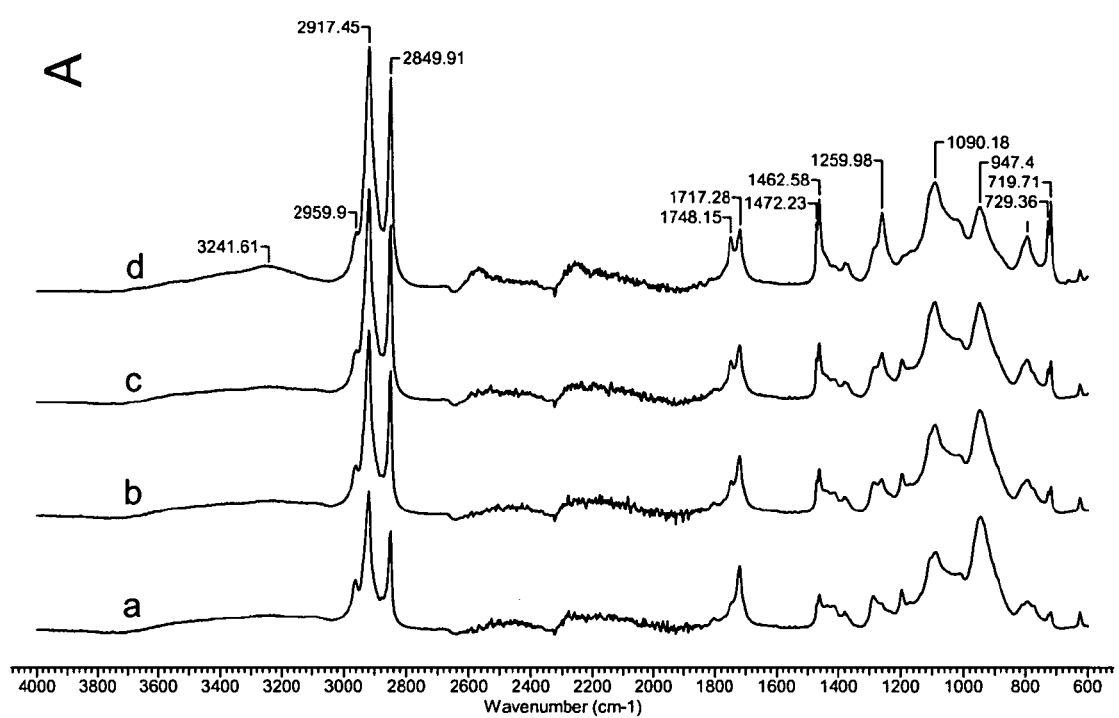
FIG. 21 is a diagram illustrating in situ FT-IR results of heating stage of parallel reactions of copolymerization of ethylene and VTMO and hydrolysis of TEOS/VTMO (Example 14).

1.03 g VTMO, 2.03 g TEOS, 0.0089 mol DEPDC in 20.02 g heptane, 4.06 g acetic acid are introduced into the autoclave, subsequently purged with ethylene to remove air. Then compressed ethylene is introduced into the autoclave and starts heating to 80° C. Ethylene is continually added into the autoclave to reach pressure at 2500 Psi. Afterwards the system was run for 4 hrs. FIGS. 20 and 21 show the procedure of experimental and ethylene reaction rate during the polymerization. FIG. 20 shows changes of in situ FT-IR spectra of the reactants under supercritical ethylene. The decreases of absorbance of VTMO, TEOS acetic acid is seen due to dilution effect with supercritical fluid. FIG. 21 illustrates the in situ FT-IR during the heating procedure. The increases in intensities of peaks at 2917 and 2849 $cm^{-1}$ indicate copolymerization of ethylene and VTMO to form the organic part, while the increases in intensities of peaks at 1472, 1462 and 1260 $cm^{-1}$ indicate the hydrolysis of TEOS and VTMO occurs to form the inorganic part. After the reaction, the autoclave is cooled down and ethylene is vented out. The collected sample is white powder, 11.31 g. Silica content is calculated as 4.1% by weight. The XPS studies of the polymer composite obtained is illustrated in FIG. 22a.

Example 15

Figure 22:
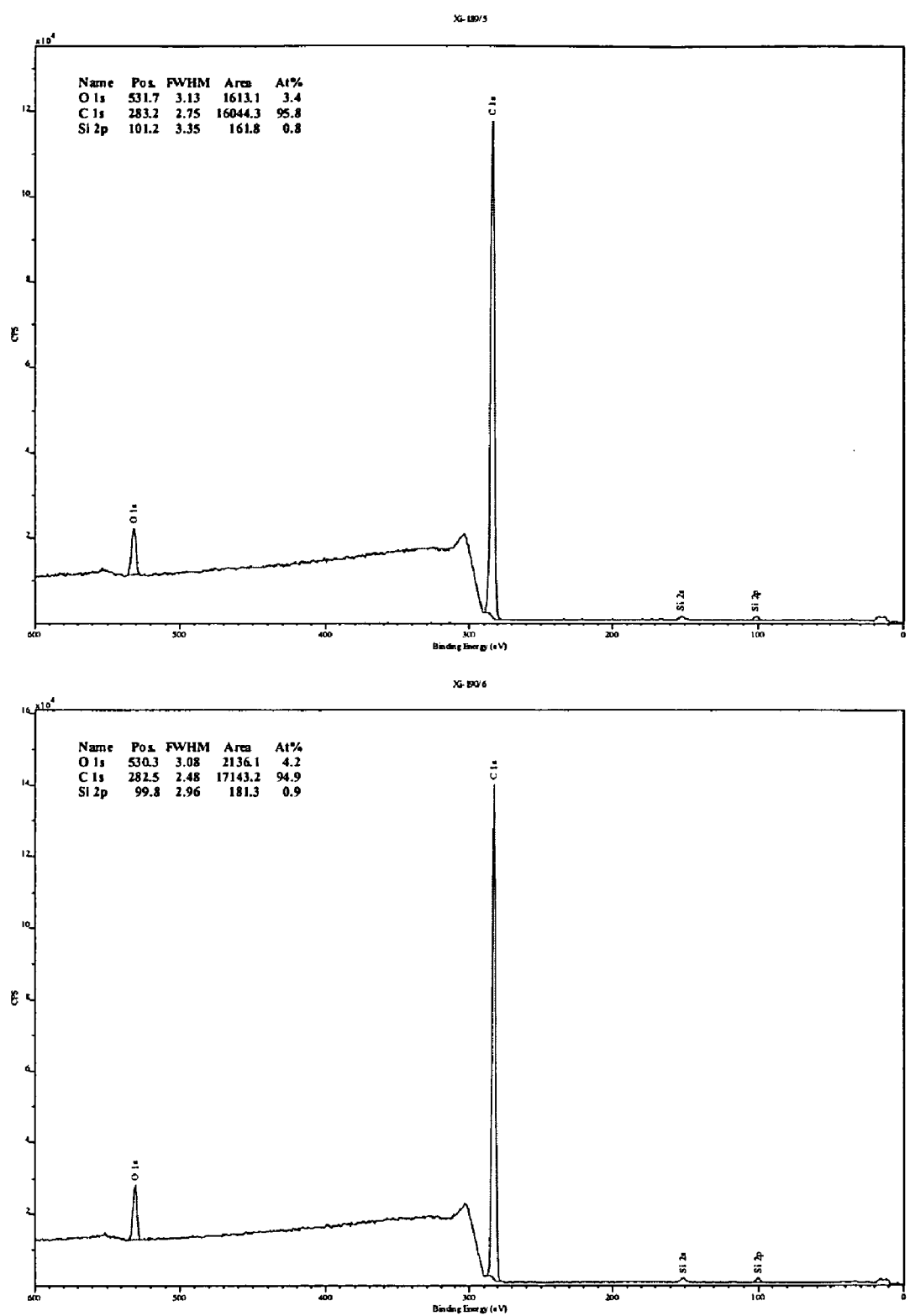
FIG. 22 illustrates XPS result of polymer composites obtained from example 14 and 15. Sample: upper example 14 and down example 15.

This example illustrates the polymerization of ethylene and VTMO and hydrolysis of TEOS/VTMO with acetic acid in supercritical ethylene, the ratio of TEO/VTMO was changed compared to example 14. 1.06 g VTMO, 4.00 g TEOS, 0.0091 mol DEPDC in 20.07 g heptane, 6.65 g acetic acid are introduced into the autoclave, subsequently purged with ethylene to remove air. Then compressed ethylene is introduced into the autoclave and starts heating to 80° C. Ethylene is continually added into the autoclave to reach pressure at 2500 Psi. Afterwards the system is run for 4 hrs. After the reaction, the autoclave is cooled down and ethylene is vented out. The collected sample is white powder, 12.32 g. Silica content is calculated as 6.05% by weight. The XPS result of the polymer composite obtained from is illustrated in FIG. 22b.

Example 16

Figure 23:
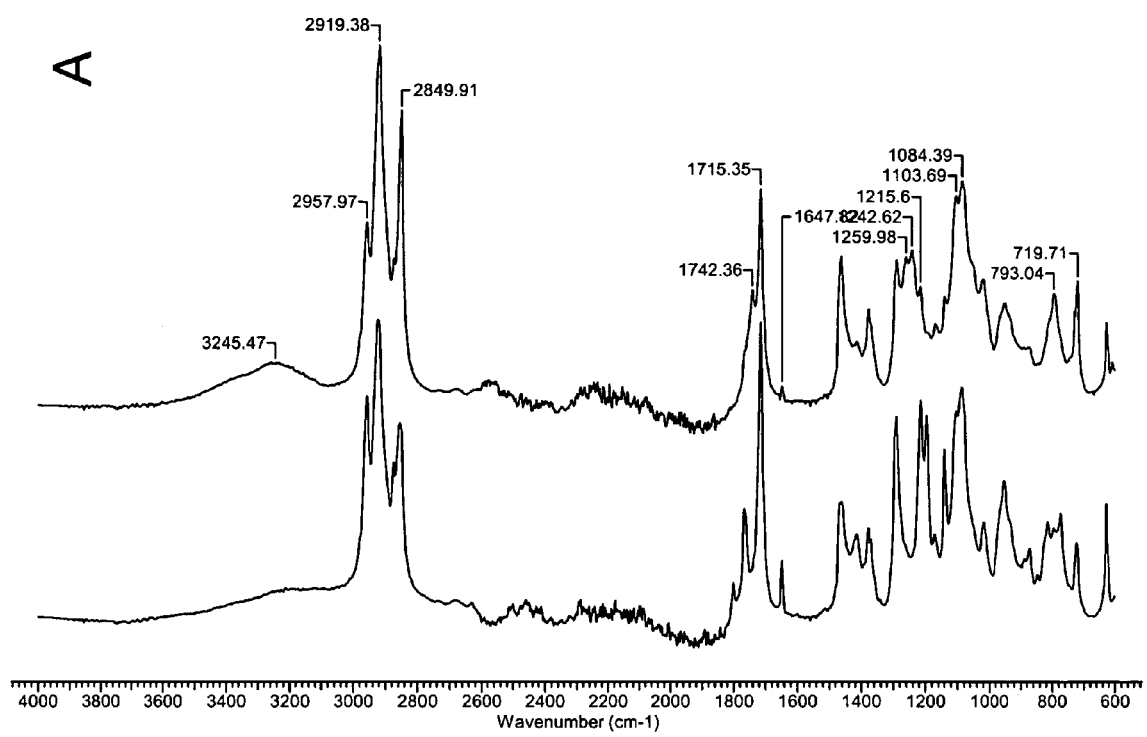
FIG. 23 is a diagram illustrating in situ FT-IR results of parallel reactions of polymerization of ethylene, vinyl acetate, and VTMO and hydrolysis of TEOSNTMO in Example 17.
Figure 24:
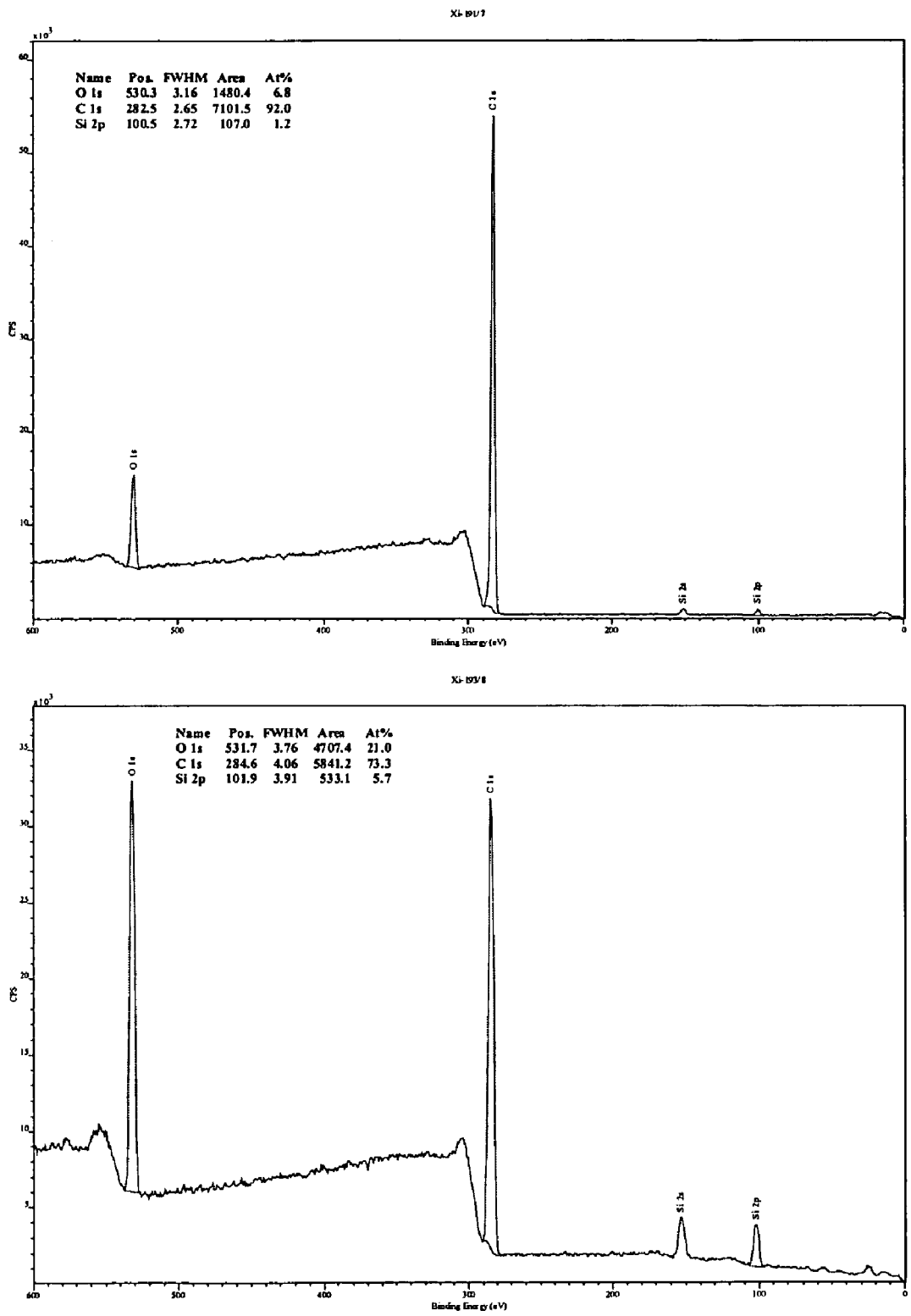
FIG. 24 illustrates XPS result of polymer composites obtained from example 16 and 17. Sample: upper example 16 and down example 17.
Figure 25:
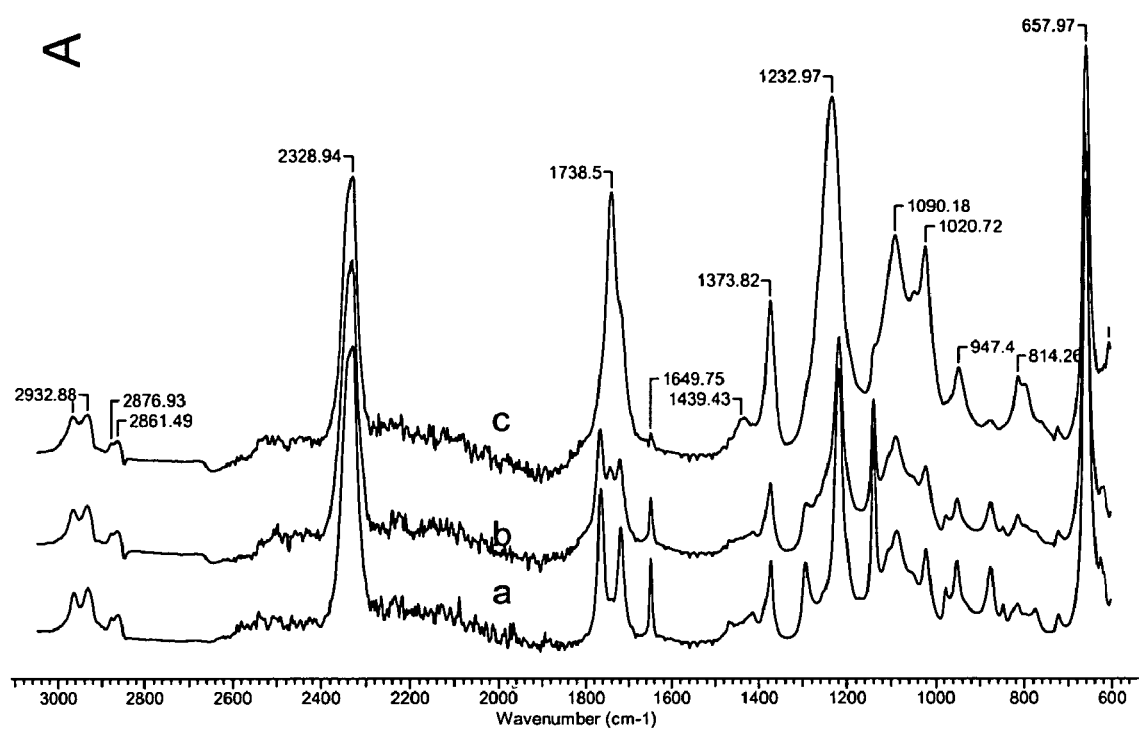
FIG. 25 is a diagram illustrating in situ FTIR results of parallel reactions of polymerization of vinyl acetate, and VTMO and hydrolysis of TEOS/VTMO in Example 17.

This example illustrates the polymerization of ethylene, vinyl acetate and VTMO and hydrolysis of TEOS/VTMO with acetic acid under supercritical ethylene. 1.30 g VTMO, 2.10 g TEOS, DEPC 0.0092 mol in 20.05 g heptane, 4.19 g acetic acid and 2.06 g vinyl acetate are introduced into the autoclave, subsequently purged with ethylene to remove air. Compressed ethylene gas is then introduced into the autoclave and starts heating to 80° C. Ethylene is continually added into the autoclave to reach a pressure of 2500 Psi. Afterwards the system is run for 3 hrs. FIG. 23 shows the FT-IR results of reactants and products during the process. The increases in intensities of peaks at 2919 and 2850 $cm^{-1}$ are contributed by polyethylene formation. The decrease of intensity of peak at 1647 $cm^{-1}$ is due to vinyl acetate converting to PEVa. The significant changes in the wavelength range of 1100-1300 $cm^{-1}$ is due to the formation of silica in the copolymer. After the reaction, the autoclave is cooled down and ethylene is vented out. The collected sample is white powder, 12.91 g. Silica content is calculated as Si, 5.4% by weight. XPS result of polymer composite obtained from Example 16 is illustrated in FIG. 24a.

Example 17

This example illustrates the polymerization of ethylene and VTMO and hydrolysis of TEOS/VVTMO with acetic acid under supercritical ethylene, the ratio of TEOS/VTMO is changed compared to examples 1 and 2. 2.01 g VTMO, 10.02 g TEOS, 0.0046 mol DEPDC in 10 g heptane, 15.95 g acetic acid are introduced into the autoclave, subsequently purged with ethylene to remove air. Then compressed ethylene is introduced into the autoclave and starts heating to 80° C. Ethylene is continually added into the autoclave to reach pressure at 2500 Psi. Afterwards the system is run for 4 hrs. After the reaction, the autoclave is cooled down and ethylene is vented out. The collected sample is white powder, 5.96 g. Silica content is calculated as Si, 29.3% by weight. XPS studies of the resulting polymer composite obtained from this example is illustrated in FIG. 24b.

Example 18

This example illustrates the polymerization of vinyl acetate and VTMO and hydrolysis of TEOS/VTMO with acetic acid at 60° C. under supercritical $CO_2$. 15.14 g vinyl acetate, 2.01 g VTMO, 2.05 g TEOS, 0.0046 mol DEPDC in 10 g heptane, 5.29 g acetic acid are introduced into the autoclave, subsequently purged with $CO_2$ to remove air. Then compressed $CO_2$ was introduced into the autoclave and starts heating to 60° C. Compressed $CO_2$ was continually added into the autoclave to reach a pressure of 3400 Psi. Afterwards, the system is run for 4 hrs. After the reaction, the autoclave was cooled down and $CO_2$ was vented out. The collected sample is an adhesive compound, and washed by methanol, and then dried under vacuum. Silica content is calculated as Si, 3.98% by weight.

Example 19

This example illustrates the polymerization of vinyl acetate and VTMO and hydrolysis of TEOS/VTMO with acetic acid at 80° C. under supercritical $CO_2$. 15.07 g vinyl acetate, 2.02 g VTMO, 2.08 g TEOS, 0.0069 mol in 15 g heptane, 5.30 g acetic acid are introduced into the autoclave, subsequently purged with CO2 to remove air. Then compressed $CO_2$ is introduced into the autoclave and starts heating to 80° C. Compressed $CO_2$ is continually added into the autoclave to reach pressure at 2300 Psi. Afterwards the system is run for 4 hrs. After the reaction, the autoclave is cooled down and $CO_2$ is vented out. The collected sample is a viscous liquid, adhesive-type compound, and washed by methanol, and then dried under vacuum. The silica content is calculated as Si, 4.03% by weight.

To summarize, the affecting factors for the one-pot synthesis are summarized in FIG. 26.

CONCLUSIONS

While the present invention has been described with what are presently considered to be the preferred embodiments, the claims are not to be limited to the disclosed embodiments. To the contrary, the claims are intended to cover various modifications and equivalent structures and functions as are apparent from the appended claims. One of skill in the art may alter the described examples, and reasonable modifications and variations are possible from the foregoing disclosure without departing from either the spirit or scope of the present invention.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES CITED

U.S. Patent Documents

1. U.S. Pat. No. 5,412,016 Sharp May 2, 1995.
2. U.S. Pat. No. 5,334,292 Rajeshwar, et al., Aug. 2, 1994.
3. U.S. Pat. No. 5,492,769, Pryor, et al., Feb. 20, 1996
4. U.S. Pat. No. 6,034,151 Moszner, et al. Mar. 7, 2000.

5. U.S. Pat. No. 6,472,460 Okamoto, et al. Oct. 29, 2002.
6. U.S. Pat. No. 6,472,104 Ulrich, et al. Oct. 29, 2002.
7. U.S. Pat. No. 5,965,202 Taylor-Smith, et al. Oct. 12, 1999.
8. U.S. Pat. No. 6,608,129, Aug. 19, 2003, Koloski, et al.
U.S. Pat. No. 6,579,927 Fischer; Hartmut Rudolf Jun. 17, 2003.
10. U.S. Pat. No. 4,584,365, Jada et al. Apr. 22, 1986.
11. U.S. Pat. No. 4,831,006, Aufdembrink, May 16, 1989.
12. U.S. Pat. No. 5,773,489, Sato Jun. 30, 1998.
13. U.S. Pat. No. 5,861,176 Ducheyne, et al. Jan. 19, 1999.
14. U.S. Pat. No. 5,706,06, Fukunaga, et al. Jan. 6, 1998.
15. U.S. Pat. No. 6,159,539, Schwertfeger et al. Dec. 12, 2000.
16. U.S. Pat. No. 6,602,966, Vargas et al. Aug. 5, 2003.

OTHER REFERENCES

1. Wieczorek, W.; Florjanczyk, Z.; Stevens, J. R. Electrochimica Acta, Vol. 40 (13-14), October, pp. 2251-2258, 1995.
2. Das, N. C. Chaki, T. K., Khastgir, D. Chakraborty, A. Journal of Applied Polymer Science, Volume: 80, Issue: 10, 16 June, pp. 1601-1608, 2001.
3. Loos, J.; Thune, P. C.; Niemantsverdriet, J. W.; Lemstra, P. J.; Macromolecules; 32(26); 8910-8913, 1999.
4. Guan, Z.; J. Am. Chem. Soc.; (Communication); 124(20); 5616-5617, 2002.
Boone, H. W.; Athey, P. S.; Mullins, M. J.; Philipp, D.; Muller, R.; Goddard, W. A.; J. Am. Chem. Soc.; (Communication); 124(30); 8790-8791, 2002.
Greco, Roberto. Properties and Optical behavior of PEVinyl Copolymer IPN-Like networks, in Advanced Polymeric Materials, Shonaike, Gabriel O. and Advani, Suresh G, Eds., CRC press, New York, 209-235, 2003.
Carrado, Kathleen A. Polymer-Clay Nanocomposites, in Advanced Polymeric Materials, Shonaike, Gabriel O. and Advani, Suresh G, Eds. CRC press, New York, pp. 349-396, 2003.
A. Vincenza, H. Kuang-Ting and A. Suresh G. Review of Polymer Composites with Carbon Nanotubes, in Advanced Polymeric Materials, Shonaike, Gabriel O. and Advani, Suresh G, Eds. CRC press, New York, pp. 397-438, 2003.
W. Shing-Chung and M. Yiu-Wing. Performance Synergism in Polymer-Based Hybrid Materials, in Advanced Polymeric Materials, Shonaike, Gabriel O. and Advani, Suresh G, Eds. CRC press, New York, 439-478, 2003.
10. Masaya Kawasumi, Naoki Hasegawa, Makoto Kato, Arimitsu Usuki, and Akane Okada Macromolecules, 30 (20), 6333-6338, 1997.
11. H. K. Schmidt, Journal of Sol-Gel Science and Technology, pp. 557-565 1997.
12. Rong Junfeng, Jing Zhenhua, Li Hangquan, Sheng Miao, Macromolecular Rapid Communication, Volume: 22, Issue: 5, March, pp. 329-334, 2001.
13. Lucien F. P., Foster N. R., J. Supercritical Fluids 17,111-134, 2000.
14. J. Jung and M. Perrut, J. Supercritical Fluids 20 179-219, 2001.
15. Okitsugu Kajimoto, Chem. Rev., 99 (2), 355-390, 1999. Jan. 13, 1999.
16. Christopher F. Kirby and Mark A. McHugh, Chem. Rev., 99 (2), 565-602, 1999. Jan. 13, 1999.
17. Anita J. Mesiano, Eric J. Beckman, and Alan J. Russell, Chem. Rev., 99 (2), 623-634, 1999. Jan. 9, 1999.
18. Phillip E. Savage, Chem. Rev., 99 (2), 603-622, 1999. Jan. 5, 1999.
19. Mesiano et al. Chem. Rev., 99 (2), 623-634, 1999. Jan. 9, 1999. Clarke et al., J. Am. Chem. Soc., 116:8621, 1994.

Therefore what is claimed is:

1. A method of preparing polymer composites, polymer nanocomposites, or organic-inorganic hybrid materials, comprising hydrolysis, or polymerization and hydrolysis within polymers in supercritical fluids.

2. The method of claim 1, wherein said polymers comprise polyethylene, poly(ethylene co vinyl acetate), or other polyolefins.

3. The method of claim 1, wherein said hydrolysis applies to metal alkoxides of inorganic precursors with hydrolysis agents comprising organic or inorganic acids or bases in supercritical fluids.

4. The method of claim 3, wherein said hydrolysis agents comprise organic or inorganic acids or bases in either organic solution or aqueous solution under supercritical conditions.

5. The method of claim 3, wherein said hydrolysis agents are selected from the group consisting of organic acids, formic acid, acetic acid.

6. The method of claim 3, wherein said inorganic metal alkoxides as precursors are TEOS, TMOS.

7. The method of claim 1, wherein said polymerization is conducted using vinyl monomers, selected from the group consisting of ethylene, propylene, styrene, vinyl acetate, vinyl silanes, and vinyl chloride.

8. The method of claim 1, wherein said polymerization is initiated by free radicals generated from radical initiators selected from the group consisting of organic peroxides, peroxydicarbonates and AIBN.

9. The method of claim 1, wherein said the hydrolysis and polymerization employ coupling agents such as metal alkoxides containing vinyl group.

10. The method of claim 9, wherein said coupling agents apply to VTMO.

11. The method of claim 1, wherein said reactions can be carried out in either organic solvents or inorganic solvents including supercritical fluids.

12. The method of claim 1, wherein polymeric composites are generated from the method of claim 1, said compositions generally having polymer and inorganic network chemically bonded to the polymer.

13. The method of claim 12, wherein the polymeric composites comprise: a thermoplastic elastomer polyolefin which is the free radical polymerization product of vinyl monomers; and Si, Ti, Zr inorganic polymer or network which is the hydrolysis result of these precursors.

14. The method of claim 13, wherein said vinyl monomer is ethylene, vinyl acetate.

15. The method of claim 13, wherein said vinyl monomers also include vinyl silanes.

16. The method of claim 13, wherein said inorganic networks are (O-Me-O-)n, (O-Me(I)—O-Me(II))n.

17. The method of claim 13, wherein the inorganic networks (O-Me-O-)n are chemically bonded to the polymer.

18. The method of claim 13, wherein the amount of said polyolefin is between about 100 and about 0 per part inorganic network.

19. The method of claim 13, wherein the amount of said inorganic network is between about 100 and about 0 parts per part organic polymer.

20. The method of claim 13 comprising application on solid surfaces as coating, internal pores of porous materials as filler, and free space inside solid materials.

* * * * *